(12) United States Patent
Sheldon

(10) Patent No.: US 7,606,925 B2
(45) Date of Patent: Oct. 20, 2009

(54) VIDEO DELIVERY WORKFLOW

(75) Inventor: Andrew K. Sheldon, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 10/653,567

(22) Filed: Sep. 2, 2003

(65) Prior Publication Data

US 2005/0050218 A1  Mar. 3, 2005

(51) Int. Cl.
G06F 15/16  (2006.01)
(52) U.S. Cl. .......................... 709/231; 725/51; 725/52; 725/53; 725/54; 725/55; 726/26; 726/27; 726/28; 726/29; 726/30
(58) Field of Classification Search ............. 705/51–59; 725/39–59, 91–97; 726/26–33; 709/231
See application file for complete search history.

(56) References Cited

U.S. PATENT DOCUMENTS

| | | | | |
|---|---|---|---|---|
| 5,485,197 A * | 1/1996 | Hoarty | .......................... | 725/37 |
| 6,151,632 A * | 11/2000 | Chaddha et al. | ............. | 709/231 |
| 6,405,215 B1 * | 6/2002 | Yaung | ..................... | 707/104.1 |
| 6,421,706 B1 * | 7/2002 | McNeill et al. | ............. | 709/204 |
| 6,427,238 B1 * | 7/2002 | Goodman et al. | ........... | 725/136 |
| 6,516,348 B1 * | 2/2003 | MacFarlane et al. | ........ | 709/224 |
| 6,760,721 B1 * | 7/2004 | Chasen et al. | .................. | 707/3 |
| 6,910,045 B2 * | 6/2005 | Hickey et al. | ............... | 707/102 |
| 7,039,932 B2 * | 5/2006 | Eldering | ...................... | 725/35 |
| 7,080,400 B1 * | 7/2006 | Navar | .......................... | 725/139 |
| 2001/0013068 A1 * | 8/2001 | Klemets et al. | ............. | 709/231 |
| 2002/0010740 A1 * | 1/2002 | Kikuchi et al. | ............. | 709/203 |
| 2002/0038359 A1 * | 3/2002 | Ihara et al. | .................. | 709/219 |
| 2002/0042922 A1 * | 4/2002 | Wang et al. | .................... | 725/92 |
| 2002/0078449 A1 * | 6/2002 | Gordon et al. | ................. | 725/41 |
| 2002/0083182 A1 * | 6/2002 | Alvarado et al. | ............ | 709/231 |
| 2002/0087978 A1 * | 7/2002 | Nicholson et al. | ............. | 725/34 |
| 2002/0152318 A1 * | 10/2002 | Menon et al. | ................ | 709/231 |
| 2002/0188944 A1 * | 12/2002 | Noble | .......................... | 725/39 |
| 2003/0005429 A1 * | 1/2003 | Colsey | .......................... | 725/8 |
| 2003/0009579 A1 * | 1/2003 | Kawai et al. | ................. | 709/231 |
| 2003/0023757 A1 * | 1/2003 | Ishioka et al. | ................ | 709/246 |
| 2003/0093530 A1 * | 5/2003 | Syed | .......................... | 709/226 |
| 2003/0152904 A1 * | 8/2003 | Doty, Jr. | ..................... | 434/350 |
| 2003/0204614 A1 * | 10/2003 | Spio | ............................ | 709/231 |
| 2003/0229898 A1 * | 12/2003 | Babu et al. | ..................... | 725/87 |
| 2004/0015994 A1 * | 1/2004 | Choi et al. | ..................... | 725/87 |
| 2004/0059795 A1 * | 3/2004 | Ramey | ....................... | 709/217 |
| 2004/0088730 A1 * | 5/2004 | Gopalan et al. | ............... | 725/93 |
| 2004/0103120 A1 * | 5/2004 | Fickle et al. | ............. | 707/104.1 |

(Continued)

*Primary Examiner*—Dohm Chankong
*Assistant Examiner*—Tauqir Hussain
(74) *Attorney, Agent, or Firm*—Lee & Hayes, PLLC

(57) ABSTRACT

Each transmission received from a video asset owner includes information regarding a video asset that is available for real time distribution during a future time period to third parties. Following a selection from among the video assets, the corresponding video asset owners receive transmissions requesting the selected video assets and one or more initial templates. The video asset owners transmit final templates that conform to the initial templates and contain information descriptive of the video assets. Each final template, and the corresponding video asset, is transmitted to predetermined network resource, such as a headend, at a predetermined time corresponding to the future time period of availability. The predetermined network resource can then distribute video assets to viewers that were requested from the corresponding video storefront by viewers.

19 Claims, 18 Drawing Sheets

U.S. PATENT DOCUMENTS

| | | |
|---|---|---|
| 2004/0128698 A1* | 7/2004 | Goldfarb et al. ............. 725/116 |
| 2004/0162895 A1* | 8/2004 | Mok et al. .................. 709/223 |
| 2004/0194131 A1* | 9/2004 | Ellis et al. .................... 725/34 |
| 2005/0065881 A1* | 3/2005 | Li et al. ........................ 705/40 |
| 2005/0071882 A1 | 3/2005 | Rodriguez et al. |
| 2005/0216448 A1* | 9/2005 | Talib et al. ..................... 707/3 |
| 2005/0228897 A1* | 10/2005 | Yamamoto et al. .......... 709/231 |
| 2007/0033631 A1* | 2/2007 | Gordon et al. ............... 725/132 |
| 2008/0046812 A1* | 2/2008 | Reynar et al. ................ 715/234 |

\* cited by examiner

Fig. 5

| REQ | TITLE | DISTRIBUTOR | STUDIO | BOX OFFICE | RATING | GENRE | LICENSE START | LICENSE END | RUNTIME (MIN) | SRP |
|---|---|---|---|---|---|---|---|---|---|---|
| ☑ | About Schmidt | Warner Bros. | New Line Cinema | $26M | R | Drama | 06/01/2003 | 09/15/2003 | 125 | 1.99 |
| ☐ | Four Weddings and a Funeral | Warner Bros. | Columbia TriStar | $32M | PG-13 | Comedy | 03/01/2003 | 06/30/2003 | 123 | 1.99 |
| ☑ | My Big Fat Greek Wedding | Warner Bros. | HBO Video | $88M | PG | Comedy | 05/01/2003 | 08/31/2003 | 96 | 1.99 |
| ☐ | My New Movie | Warner Bros. | HBO Video | | PG-13 | Comedy | 05/01/2003 | 09/30/2003 | 15 | 1.99 |
| ☑ | Snatch | Warner Bros. | Columbia TriStar | $52M | R | Comedy | 03/01/2003 | 06/30/2003 | 103 | 2.99 |
| ☐ | The Sopranos #1 | HBO on Demand | HBO Video | | NR | Entertainment | 01/01/2003 | 12/31/2003 | 56 | 1.50 |
| ☑ | The Transporter | Warner Bros. | 20th Century Fox | $37M | PG-13 | Action | 04/01/2003 | 06/30/2003 | 90 | 2.49 |

[search again] [request assets]

VIDEO DELIVERY WORKFLOW

TECHNICAL FIELD

The present invention relates generally to audio-video entertainment systems, and more particularly to the advertisement of video delivery services to viewers such as video on demand and pay per view.

BACKGROUND

Multimedia home entertainment is desirable to consumers who seek out new kinds of listening and viewing content that are made availability through a variety of communication media, including wireless broadcast and cable systems. Two such forms of multimedia home entertainment are pay per view (PPV) and video-on-demand (VOD) services. Each service offers a viewer a video (e.g., a motion picture) that is delivered for viewing by the viewer who orders and pays for the viewing. The VOD service offers the viewer a video that can be requested at any time and is available for viewing at the discretion of the viewer. Each service can be offered and delivered by wireless communication, such as satellite or cellular telephone services, or by wired communication, such as a cable television service.

Both the PPV service provider and the VOD service provider are referred to herein as a video delivery service provider, a network operator (netop) or a multisystem operator (MSO). The MSO offers video delivery services to viewers via a communication system by the distribution of PPV assets and/or VOD assets, which are collectively and individually referred to here as video assets. Examples of video assets include movies, TV shows, special interest programming, etc. Video assets are obtained from a content provider or other service having ownership rights in the video assets. The video delivery service provider, in turn, has received distribution rights from the content provider. As an enticement to the viewer, the video delivery service provider may provide an advertisement about a video asset. This advertisement may be referred to a video storefront. The video storefront is made up of discrete viewing panels or screens, each of which represents one video storefront page. Thus, the video storefront is made up of a plurality of video storefront pages.

The creation of the video storefront pages for a video storefront entails production time and management for both the content owner (or its designated third party) and the MSO (or its designated third party video asset aggregator). The various tasks necessary for a MSO to make one or more requests of the content owner for the video asset(s) and supporting the video storefront page creation requires significant coordination and communication between these two or more parties. The structure of a carousel at a headend of an MSO and common navigation controls made available for use by a viewer in order to select a video asset for viewing on an viewer input device (such as Home and Back buttons) must be communicated to a designer of the video storefront pages. This complication is significantly compounded by the normal business factors that constitute the MSO business operations. These normal MSO business operations include, but are not limited to, multiple headend locations, variations in headend infrastructure, disparate video delivery servers and back office systems, multiple content partners, different subscriber access rules, large disparities in video asset usage and license rights, and multiple video asset viewing windows. Coordinating the distribution of video assets to viewers, each of which can have complicated content ownership rights and distribution rights, can be a difficult and complicated task to perform by the MSO. There is, at present, an absence of automation tools to facilitate communication between several video asset owners partnered with an MSO. This lack of automated communication makes the tasks of collecting and scheduling video assets and video storefront pages advertising the same at each appropriate headend somewhat hindered. This hindrance diminishes the ability of the MSO to use a video storefront as a vehicle to promote video assets so as to increase video delivery buy rates by viewers. It would advantageous to provide systems and other tools to implement such an automated communication.

SUMMARY

Communications are automated between video asset owners and a multisystem operator (MSO) who provides video delivery services. These communications coordinate the distribution of video assets in accordance with content ownership and distribution rights granted from each video asset owner to the MSO. The automated communication can be used by the MSO and the video asset owners to create video storefronts and to select and distribute video assets. This automated communication system enables the video asset owners and the MSO to accomplish their respective tasks by accessing a single system.

The video asset owner determines assets to be made available to the MSO during a particular license time period and adds those video assets to the distribution system of the MSO. An operator, on behalf of the MSO, selects one or more video assets specified by one or more video asset owners and the corresponding periods of time during which the video asset is to be offered to viewers. The operator is provided with a total run time for each category or genre of the selected video assets for those periods of time. The MSO can then send a request for the operator-selected assets to each video asset owner. Upon receipt, the video asset owner is alerted of the MSO operator's request. The video asset owner can then service the request of the selected video assets or the video asset owner can modify the request

BRIEF DESCRIPTION OF THE DRAWINGS

A more complete understanding of the implementations may be had by reference to the following detailed description when taken in conjunction with the accompanying drawings wherein:

FIG. 5 is a screen shot of a browser application through which a MSO selects among various video assets that are being offered for distribution to the MSO by different video asset owners.

FIG. 12 is a screen shot in a browser application of a report summarizing the current video assets that available for delivery during a present time period from a particular headend, and from which a transmission plan for the particular headend can be generated by activating an on-screen button.

FIG. 13 is a screen shot in a browser application of a planning tool useful to an operator of an MSO to create a transmission plan for video assets to be distributed from a selected network, regions within the network, or headends within each region, and where scheduled video asset summaries for each headend are presented including genres and video storefront pages in each genre.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A video delivery service storefront workflow tool, in various implementations, provides a web-based environment for a multisystem operator (MSO) to plan, communicate, receive, review and schedule video storefront pages to accompany video assets for each headend or group of headends. The video delivery service provides video assets as video-on-demand (VOD) and/or pay per view (PPV) services to viewers. The workflow tool provides a password protected log in for both the MSO and video asset owners. The MSO is provided with a workflow tool for creating a transmission plan within a specified time period or 'viewing window'. The available video assets are determined by the video asset owners that upload into a database the video assets that they will license for the given period.

A search conducted by the MSO returns those video assets that fall within a time period that is specified by the MSO. The MSO can also choose to view a list of video assets that are available for partial months within the specified viewing window. The MSO then selects which video assets to license and is provided with a list of an aggregate total-run-time (TRT) by genre or category of the selected video assets. The MSO then uses a user interface of the workflow tool to interactively activate a selection function to thereby form a communication that is sent over a network (e.g., the Internet) to each video asset owner corresponding to the selected video assets of the MSO.

The video asset owner, upon receipt of the communication from the MSO, is alerted by the workflow tool that a request for a video asset is pending. The video asset owners can then respond to the request and communicate the status of the request back to the requesting MSO. When the video assets are received by the requesting MSO, they are presented in an "approvals" screen. The approvals screen provides an operator of the MSO with a means to review, modify, or reject each previously requested video asset prior to scheduling the video asset for transmission.

Figure 1:
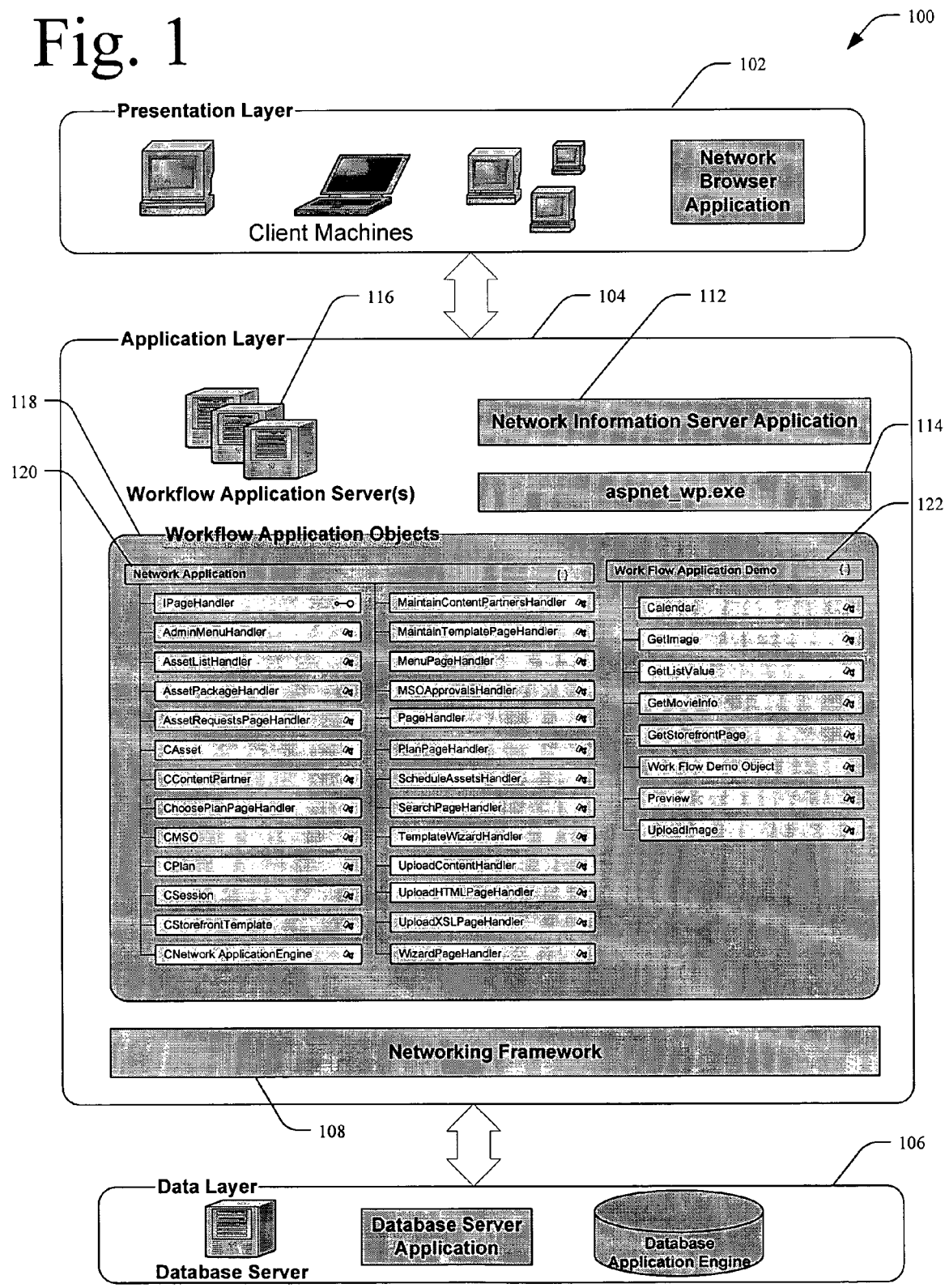
FIG. 1 depicts an exemplary environment having components for implementations in which client machines communicate using a network browser with an application layer for video delivery workflow servers, where the application layer includes various workflow application objects, where the application layer interfaces with a data layer executing on a database server, and where the database layer includes a database server application and a database application engine.

Two interfaces are depicted between three layers of an exemplary workflow tool 100 in FIG. 1 for video delivery. A presentation layer 102 interfaces with an application layer 104 and a data layer 106 interfaces with the application layer 104. The presentation layer 102 embodies client machines that access the application layer through a browser application, such as a browser application communicating over a network like the Internet.

The application layer 104 is in communication with the presentation layer 102 by a network connection to one or more servers 116 that execute workflow objects 118 in a network application 120 and in a work flow application demonstration 122. The network application 120 contains numerous modules that fulfill parts of an entirely interactive part of the workflow tool 100. The work flow application demonstration 122 contains specific data and routines that store procedures integral to the workflow tool 100.

A network information server application 112 also executes on the one or more servers 116. The application layer 104 can be based upon the ".NET" networking framework 108 as provided by the Microsoft Corporation of Redmond, Wash., USA. As such, instead of requiring each MSO of video asset owner to interact with an application or a single Web site, the .NET framework will connect each operator of the workflow tool 100 to an array of computers and services that will exchange and combine objects and data. The application layer 104 also includes an application 114 for "aspnet_wp.exe" that embodies a set of technologies that constitute a framework for building Web applications and XML Web services. The application 114 processes HTTP requests (Web requests) and can include Web pages, XML Web services, HTTP handlers, and HTTP modules. The data layer 106 is in communication with the application layer 104 by a network connection to a database server that executes a database server application and a database application engine.

The software installation for implementations of workflow tool 100 include a light software installation of a network browser at the presentation layer 102 resident at the video asset owners, and an extensive software installation at application layer 104 for use by an operator of an MSO.

Figure 2:
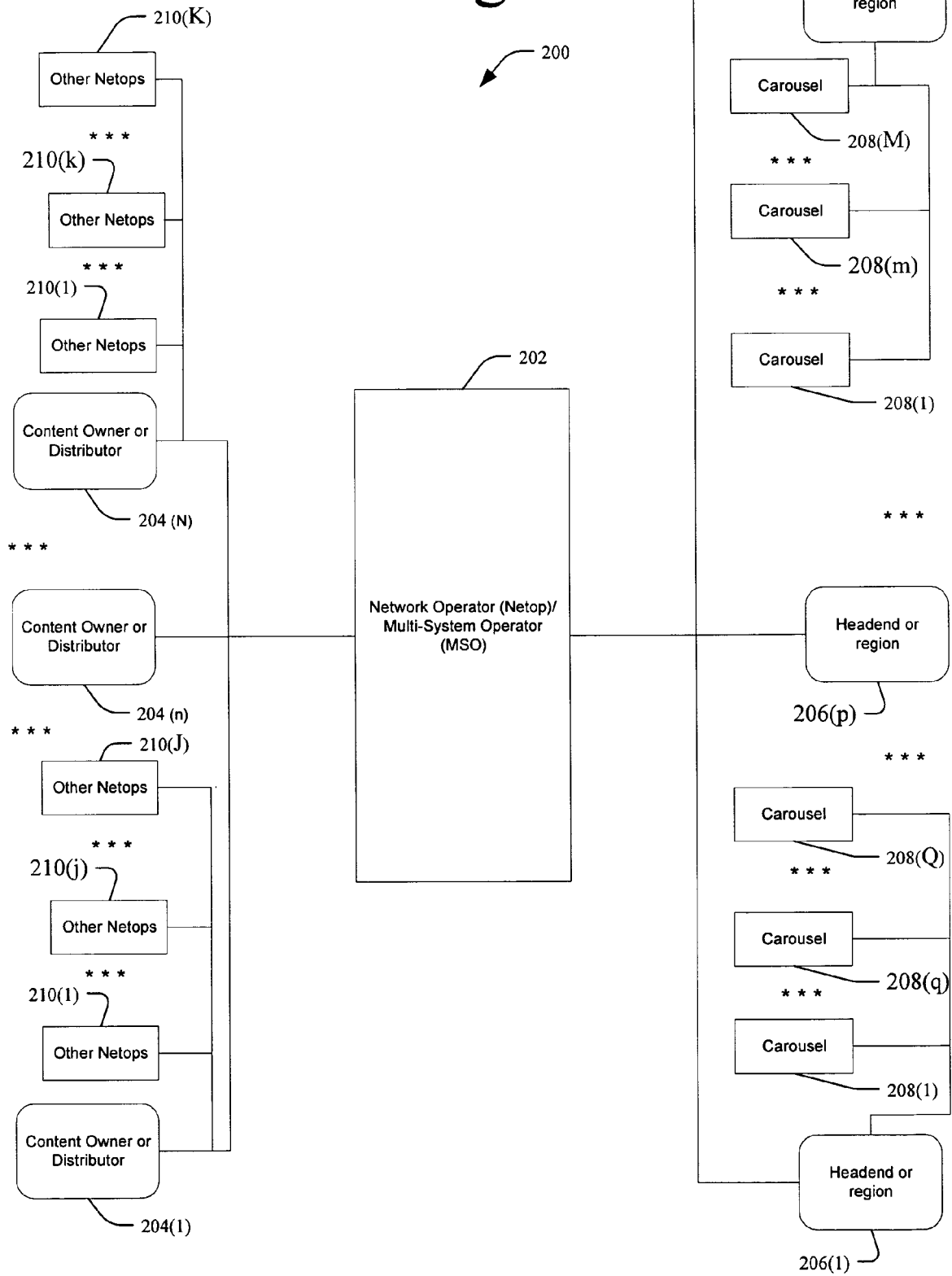
FIG. 2 is a block diagram depicting an exemplary environment in which a multisystem operator interfaces with a plurality of video asset owners and with a plurality of headends.

An exemplary environment 200 is seen in FIG. 2 in which an MSO 202 is in communication with a plurality of video asset owners 204(n), each of which can be in communication with one or more other network operators (netops) 210(j) who also can provide video assets. Each netop 210(j) can also be a provider of video delivery services—an end to end technical service for delivering of video assets. For example, a netop 210(j) can be a cellular telephone service provider that enables a video-telephone user to watch a VOD asset on the video-telephone via the end to end delivery of content by the cellular telephone service provider.

The MSO 202 is depicted as being in communication with a plurality of headends or regions 206(p), each of which is in communication with one or more carousels 208(q). The workflow tool 100 seen in FIG. 1 can perform in various implementations in the environment 200.

Figure 3:
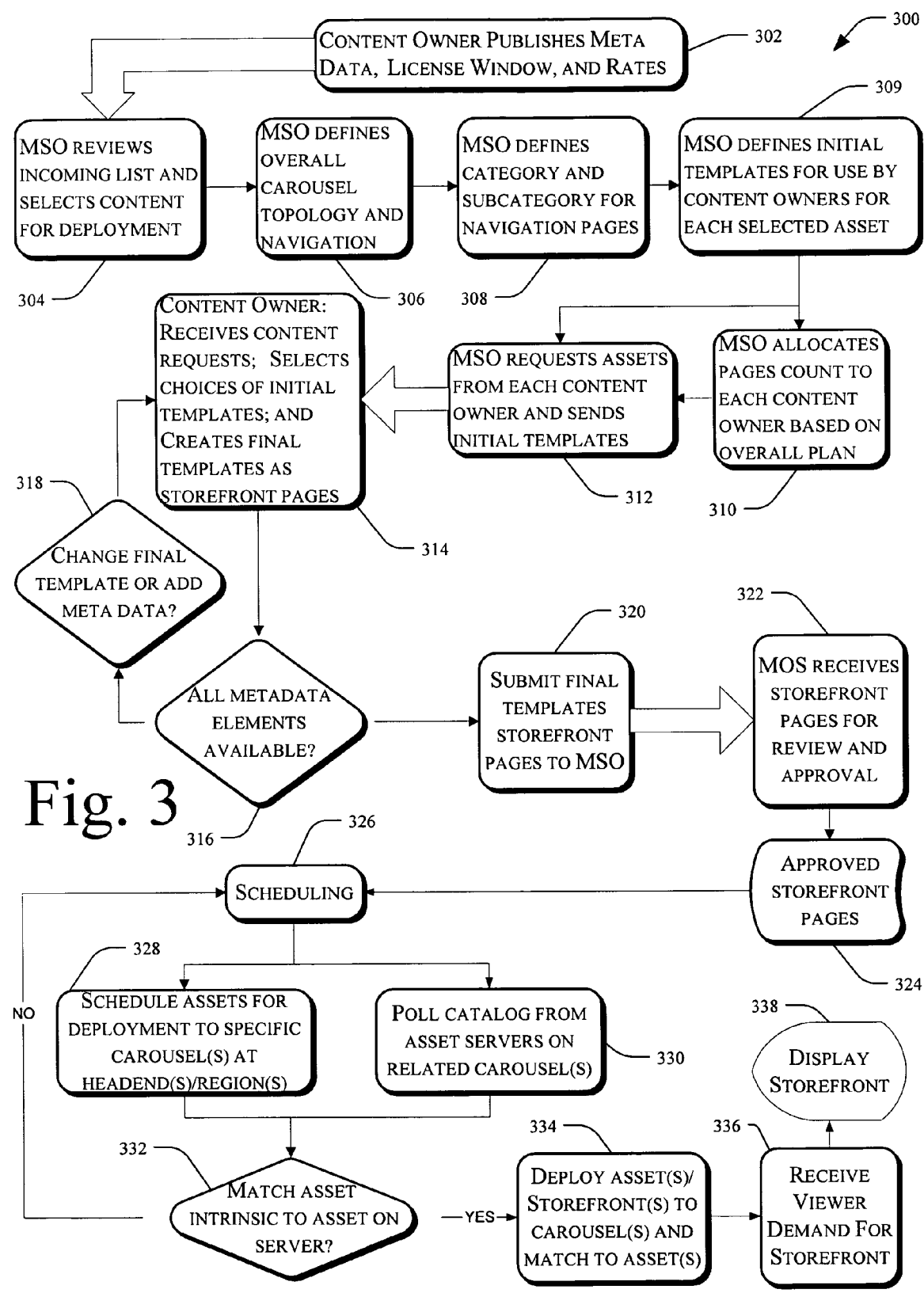
FIG. 3 is a flow chart depicting an implementation of a process by which an MSO selects video assets from a video asset owner, the video asset owner provides video storefront pages for each selected video asset, and by which the MOD schedules each selected video asset that is to be offered in a video delivery service to viewers.

FIG. 3 is a flow chart depicting an implementation of a process 300 by which the workflow tool 100 can be implemented. At block 302, a video asset owner or content owner 208(n) publishes information, such as a universal asset package, to announce that a video asset is available for distribution by video delivery service providers. The published information includes but is not limited to metadata, a license or viewing time period window for the video asset, and a rate for the video asset. These three packets of information make the video delivery service provider aware of the video asset that is being made available to be put into a video delivery service. For instance, when the offer is made by the video asset owner the offer can include an entire movie, a trailer for the movie, and behind the scenes shots during production of the movie. All three are video clips of various lengths that make up the universal asset package for the movie.

An arrow between blocks 302 and 304 indicates a transmission from the content owner to the video delivery service provider, which can be MSO 202, but can also be an individual region or headend 206(p). Upon receipt of the transmission at block 304, the operator of a MSO 202 reviews the incoming lists of video assets and selects among them for deployment as a video asset that is to be made available to viewers. After block 304, process 300 moves to block 306 where the operator of the MSO 202 defines the overall topography and navigation for each carousel 208(q) that is to be scheduled for video delivery services. At block 306, various content in different genres are planned by the operator of the MSO 202 for deployment in video delivery services. For instance, the video assets being planned for deployment may be required to fall into certain genres, such as children's programming, lifestyles or home and living, music, and action movies. Previously, the content owner will likely have classified each offered video asset by genre.

The topography of the carousel 208(q) is a hierarchical structure of pages, where the lowest order of the pages may be a starting homepage. The topology is similar to a web site having web pages that make up the web site, where a viewer first accesses the web site at its homepage. A viewer that navigates the topography of the carousel 208(q) can navigate deeper into the topography so as to access different branches. One such branch might be the action movie genre branch. Similarly, the viewer may navigate from the homepage to the genre of lifestyles, within which an episode of the television program called "Oprah" might be selected by the viewer that was available as a video asset for delivery to the viewer. This procedure for drilling down, or entering into the topography from the homepage to an individual page or pages, can be used to support the process of viewer selections for making a request for delivery of a video asset—by pay per view (PPV) or by VOD (video-on-demand). The published pages generally represent offerings by the MSO 202 for video delivery services.

At block 308, the network operator for MSO 202 defines categories and subcategories for navigation pages, then process 300 moves to block 309 where the network operator for MSO 202 designates initial templates for use by video asset owners for each of the video assets that were selected. Depending upon the MSO 204(n) of the netop 210(j) that provides the video delivery service, the templates can be quite varied. For example, if a particular movie has a series of trailers that could be shown on a video-phone provided by a cellular telephone company, a precise format may be required for the trailer videos to be properly delivered. The initial template can be selected based upon the type of end-to-end service provided by the video delivery service provider who is operating a network where viewer buy a service and view a video asset distributed by the video delivery service provider—who in turn has relationships with video asset owners for distributing that content. Thus, the viewer of video assets could be provided with this service through a wireless video-phone, a television, a landline telephone, or a monitor in communication with a power line from an electrical power utility that also provides delivery services for video assets.

At block 310, the network operator for MSO 202 allocates a particular page count to each video asset owner to be used for designing an advertisement made up of video storefront pages for a corresponding video asset, where the video storefront pages are designed based upon the designed initial template. The allocated page count is based upon an overall plan for all of the video storefronts. If, however, the templates have already been designed, process 300 can skip block 310 and move directly to block 312. At block 312, MSO 202 forms a communication that identifies the selected video assets and the initial templates for transmission to the corresponding video asset owners.

Blocks 302 through 312 identify exemplary tasks performed interactively by the network operator for MSO 202 to plan what video assets are to be made available for the video delivery service. The network operator for MSO 202 can search a database of video assets made available by video asset owners. The database is essentially uploaded or updated by each video asset owner. This upload can include the title of the video asset, a mechanically reproducible copy of the video asset, the genre or rating of the video asset, the price of the video asset, and the window that expresses the license period in which the video asset can be offered to video delivery service consumers (e.g., viewers). The network operator for MSO 202 searches available video assets to then select which ones that they want to use or they want to license or acquire. A request is then made to the video asset owner who then will service the request by delivering the pages that support the requested video asset once it has been deployed to a headend or region of headends.

The initial templates designed by the network operator for MSO 202 define how video asset information can be provided to MSO 202. Because carousels at headends have limitations, both technically and visually, the initial template is designated so as to prevent the video asset owner from advertising with a video storefront that will not function properly with a carousel that can not accommodate the video asset owner's design.

The initial template can be defined so as to prominently display the brand of the MSO 202. One such template, for example, may be designated for a children's movies storefront page. The MSO 202 might also have a special brand for their kids programming. As such, that brand would be in the initial template such that any page that had a movie in the children's programming genre would display that special brand for all kids programming. This initial template would then be provided by MSO 202 to the video asset owner 204($n$) for use to upload their children's programming genre video assets so as to fall into the format of the initial template.

At block 314, the video asset owner 204($n$) receives content requests. The video asset owner 204($n$) who has received the content request selects choices, if any, of the initial templates and then creates or designs corresponding video storefronts. The video asset owner 204($n$) will create an advertisement design that will attract viewers, thereby increasing the buy rate of their video assets by video delivery service consumers (e.g., viewers).

Process 300 moves to block 316 which queries whether all the metadata elements of a video asset are available to supply information being required by an initial template. Some initial templates can require little design effort because they will require only typical metadata that is available for a video asset, and thus lack much creative design flexibility. Other initial templates may require more design effort on the part of the video asset owner 204($n$) and have greater design flexibility. Depending on the video asset owner and the category into which the video asset falls, the initial template may require little or more effort and inversely proportional design efforts.

In one implementation, the workflow tool 100 examines each initial template for each video asset and automatically populates the initial template from corresponding fields in the metadata of the respective video asset. For instance, if the initial template requires an image of a box cover for the movie and the image has been uploaded, the workflow tool 100 will automatically size and place the box cover image in the initial template. If the initial template requires a short description, the workflow tool 100 will match the metadata for this requirement for a short description and it will be placed into the initial template. As such, little design effort was required on the part of the video asset owner in completing the initial template so as to form the requested page(s) of the video storefront.

Other data, however, may not be automatically populated by workflow tool 100. This can occur at block 318 of process 300. At block 318, a template may have a requirement for a data field that is not in the metadata. The workflow tool 100 then flags the requirement with an appropriate diagnostic. The template designer then has a choice to either change the template to a template that doesn't have the requirement or to upload the required data to the metadata or to a table for the metadata. Then, blocks 314-316 can be repeated to complete the video storefront page and process 300 can move on to block 320 at which the final templates of the video storefronts are submitted in a transmission to the MSO 202.

At block 322, MSO 202 receives the transmission from each video asset owner. At block 322, the operator for MSO 202 receives the video storefront pages for review and approval. At block 322, MSO 202 has essentially received the storefront pages that have been submitted by the video asset owner and the workflow tool 100 indicates to the operator that these pages are in a queue pending approval. The queue gives the operator of MSO 202 an opportunity to look at the video assets that are being submitted and to verify that the video asset owners have used the correct initial templates and that the final template proposed by the video asset owner is correct. For instance, some discretion may be allowed to the operator of MSO 202 as to approval of the proposed video storefronts.

A clearing house file 324 of the approved video storefront pages is stored, ready for publishing to an actual carousel that has or will be designed via the scheduling through processing steps beginning at block 326. At block 326, a split for dual processing occurs by block 328 for scheduling of assets for deployment to specific carousels 208($q$) at headends/regions 206($p$), and by block 330 where a poll is taken of catalogs from video delivery servers and related carousels from data layer 106 as seen in FIG. 1. In essence, various video storefront pages have been approved that are not to be scheduled for deployment until the corresponding video asset is resident and available on the video delivery server from data layer 106. This prevents a viewer from requesting a video asset that is not actually resident on the video delivery server from data layer 106 such that the request would not be able to be accommodated. The workflow tool 100 at block 330 polls what is called the catalogue. The catalogue is a published application program interface (API) that lists all of the titles of video assets that have been successfully loaded on the video delivery server from data layer 106. When the polling of the catalogue at block 330 determines that there is an asset on the video delivery server whose metadata corresponds to a page that is sitting in the clearing house of files at block 324, video asset in the clearing house 324 is flagged to announce that the video asset is then ready for scheduling. The polling and checking process at block 330 ensures that a video storefront page is scheduled on the carousel at block 328 when its corresponding video asset is available to the carousel.

A query is performed at block 332 where an attempt is made to match a video asset intrinsic to a video asset on the video delivery server from data layer 106. The function performed at block 332 corresponds to an on-screen graphic button on a video storefront page. If the button is selected by a viewer using an input device, such as a remote control, workflow tool 100 would send a command that would active the video delivery service for a video asset being requested by the viewer. The intrinsic represents an argument to automatically confirm the presence of the viewer-requested video asset from the catalogue to the video delivery server so that the video asset can be properly deployed at block 334 in an automated fashion. If the check at block 332 has not be satisfied, process 300 returns to the scheduling block 326 for a repetition of the foregoing.

At block 334, after the check at block 332 has been satisfied, a deployment of the video asset is made to the designated carousel and a match is made to the video asset. The procedure undertaken to the point of block 334 can be summarized by way of the following example. A navigation page has a list of titles of movies that are in a particular category, of one of which is titled "MOVIE A". That navigation page is automatically and dynamically created by the workflow tool 100 based on all of the video assets that have been created or have been assigned for this specific category. For that navigation page, if the "MOVIE A" title does not appear in the process of polling the catalogue, then "MOVIE A " will not be shown in the navigation page because there is a way to navigate to the actual page which in turn doesn't have the "MOVIE A " video asset associated with it. So the effect of this double checking is that the workflow tool 100 makes sure that the overall end to end system of supplying a requested video asset is going to work as represented to the viewers. When a viewer demands to see a storefront for a requested video asset by way of input (e.g., a remote control device operated by a viewer), the demand is received at block 336 and the storefront is displayed for the viewer at block 338.

Figure 4:
FIG. 4 is a screen shot of an exemplary log screen in a browser application through which access is obtained by both an MSO and video asset owners to a system for delivering video assets and corresponding video storefronts to viewers.

FIGS. 4 through 14 provide exemplary screen shots of a user interface to the workflow tool 100 as explained below. FIG. 4 is a screen shot 400 of an exemplary log on screen that can be used by an operator for an MSO or for a video asset owner to access the workflow tool 100. The log on screen is accessible by using a browser application through which access is obtained by both an MSO and video asset owners to a system for providing video assets and corresponding video storefronts to viewers. Both user name and password can be entered via entry fields 402.

Once a MSO 202 has received a communication from a video asset owner that a video asset is available for use in a video delivery service, an operator for the MSO requests video assets from those video asset owners offering the same. FIG. 5 is a screen shot of a browser application through which an operator for an MSO selects among various video assets that are being offered by different video asset owners for distribution to the MSO.

Figure 6A:
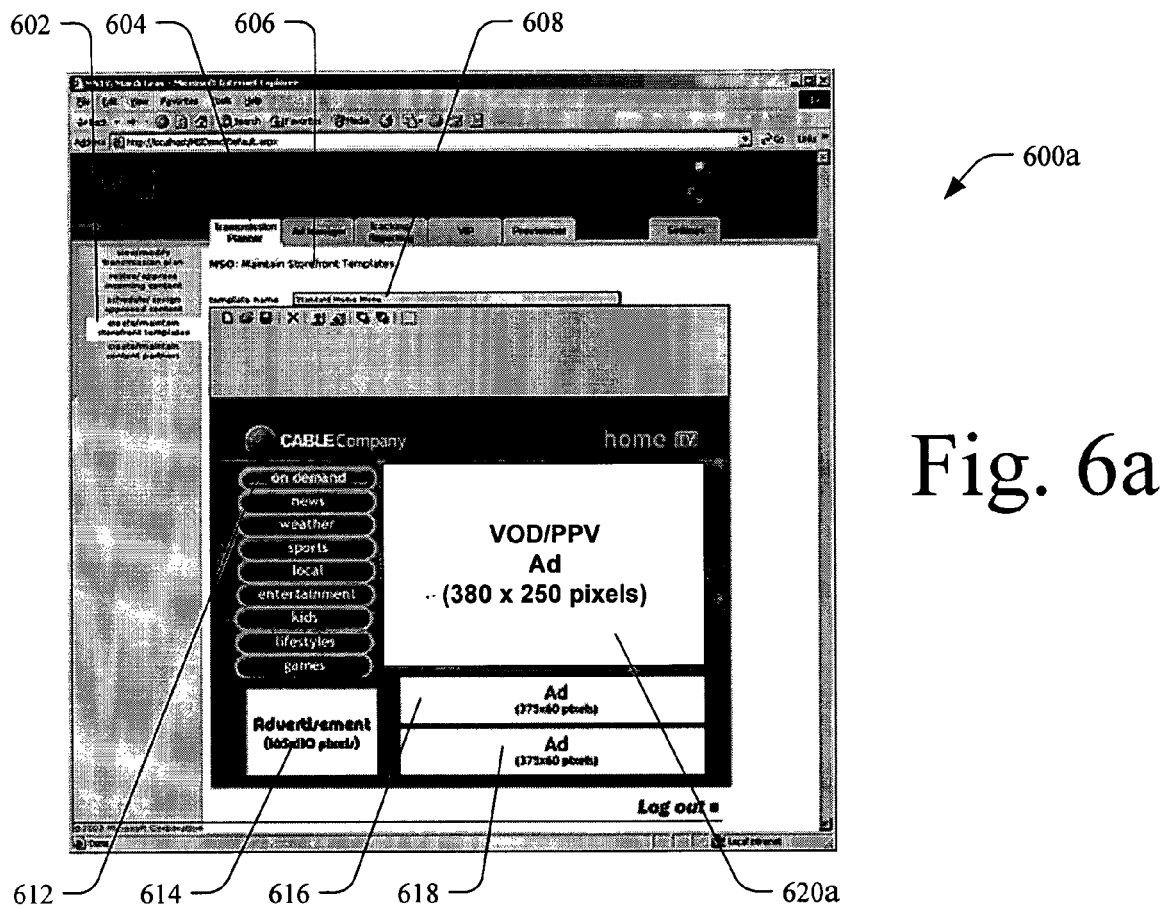
FIGS. 6*a*-6*b* are two different screen shots in a browser application of respective user interfaces for creating and maintaining an initial template, where the initial template can be sent from a MSO to a video asset owner for further design so as to form a video storefront that serves as an advertisement for a particular video asset or advertisement, and where other information can also be added into the design that is formed from the initial template.
Figure 6B:
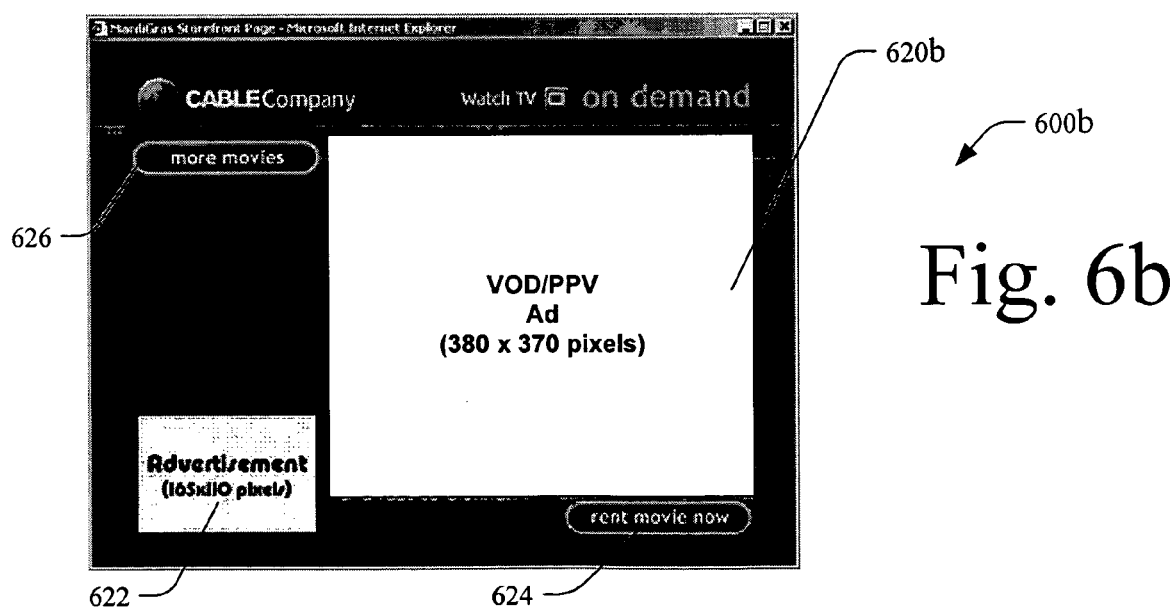

FIGS. 6a-6b are initial templates that can be created and maintained for the purposes of developing pages that will be advertising storefronts viewed by viewers. Initial templates are designed so as to be technologically compatible with a relevant headend of the MSO 202 that will be transmitting a final version thereof to viewers. FIG. 6a is a screen shot depicting a tab 602 on the screen 600a, on the left hand side, for "create/maintain storefront templates". This tab 602 initiates functions through which initial templates can be created and maintained. Diagnostic 606 of screen shot 600a indicates the current function to be "Maintain Storefront Templates". Initial templates are specified by the MSO 202 for use by video asset owners 204(n) who have content that they would like a viewer to view. The content may be a video on demand program, a pay per view movie, a video advertisement, or a static page that features graphics, text, and/or other content. Each created initial template may be saved in unique categories as appropriate for different categories of video assets (e.g., children's programming, home and garden, action movies, documentaries, etc.). The initial template can be sent from the MSO 202 to a video asset owner 204(n) for further design so as to form a video storefront that serves as an advertisement for a particular video asset, and where other information (e.g., advertisements) can also be added into the design that is formed from the initial template.

Tab 604 of screen shot 600a indicates a tab for a transmission planner used by MSO 202 to plan video content that is to be transmitted to viewers from various systems or headends operated by MSO 202. Tab 608 indicates that the initial template in screen shot 600a is a standard home menu or a homepage storefront. Regions 614, 616 and 618 on screen shot 600a, and region 622 on screen shot 600b, are areas that are available to place advertisements from video asset owners 204(n), from other third parties, or by the MSO 202. On-screen button 612 is a highlighted "on demand" button that, when activated by a viewer, will initial a display of available video assets for a video-on-demand service. Region 620a is an area on screen shot 600a in which an advertisement can be placed for a pay per view program or for a video on demand program.

Advertisements that can be placed into the regions 614, 616 and 618 are not limited to static advertising. Both moving video and/or sound could be seen and/or heard by viewers of the regions 614, 616 and 618. For instance, more than one tuner can be incorporated into a set top box, or other client device, where each of the tuners could be used to tune to different audio, video, or audio-visual media streams that includes both static ads as well as moving video and/or sound. Each of the media streams received by one of the tuners could then be output, respectively, to the regions 614, 616 and 618. Then, when a viewer highlights or otherwise selects one of the regions 614, 616 and 618, the audio portion of the stream would be heard by the viewer for the selected region. As an alternative to multiple tuners, a different video delivery platform could be used to obtain different media streams that includes both static ads as well as moving video and/or sound, such as Internet Protocol Television.

Screen shot 600b in FIG. 6b shows region 620b where a storefront can be placed for a pay per view program or for a video on demand program. By way of example, when a viewer uses an input device to activate region 620a in FIG. 6a, the workflow tool 100 will link to the page seen FIG. 6b. The viewer can then decide, based upon their subjective opinion of the storefront region 620b, whether to activate a "rent movie now" button 624 on screen shot 600b so as to pay for and begin watching the corresponding video asset. Alternatively, the viewer can activate a "more movies" button 626 in FIG. 6b such that the workflow tool 100 will link to a page (not shown) that will show the viewer additional pay per view and/or video on demand video assets that can be ordered.

Figure 7:
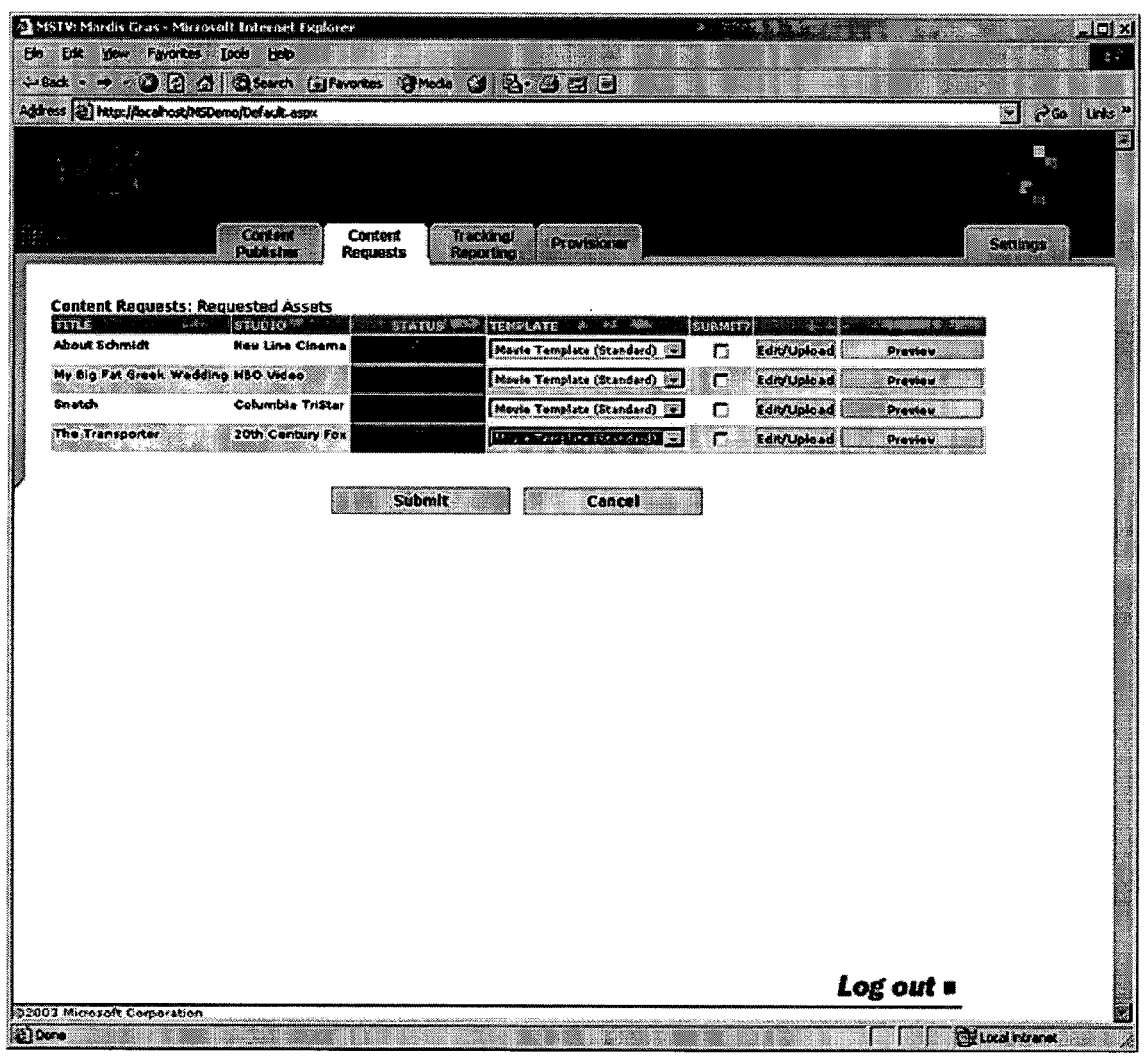
FIG. 7 is a screen shot in a browser application through which a MSO can submit a request for video assets to one or more video asset owners, where the request is submitted along with an initial template for modification by the video asset owner to design one or more pages of a video storefront as an advertisement for the video asset.

FIG. 7 is a screen shot in a browser application through which an operator for an MSO can submit a request for further information about video assets to one or more video asset owners who are offering the video assets to video delivery service providers. The screen shot depicts on-screen diagnostics to inform the operator of reasons as to why a video asset has an invalid status. The diagnostic in FIG. 7 shows that the video asset "Snatch" is missing a box image that is to be inserted into an initial template. The operator is offered the option, via an on-screen button, to perform an edit on a video storefront page corresponding to a video asset. The request is submitted by an upload function along with an initial template for modification by the video asset owner to design one or more pages of a video storefront as an advertisement for the video asset.

Figure 8:
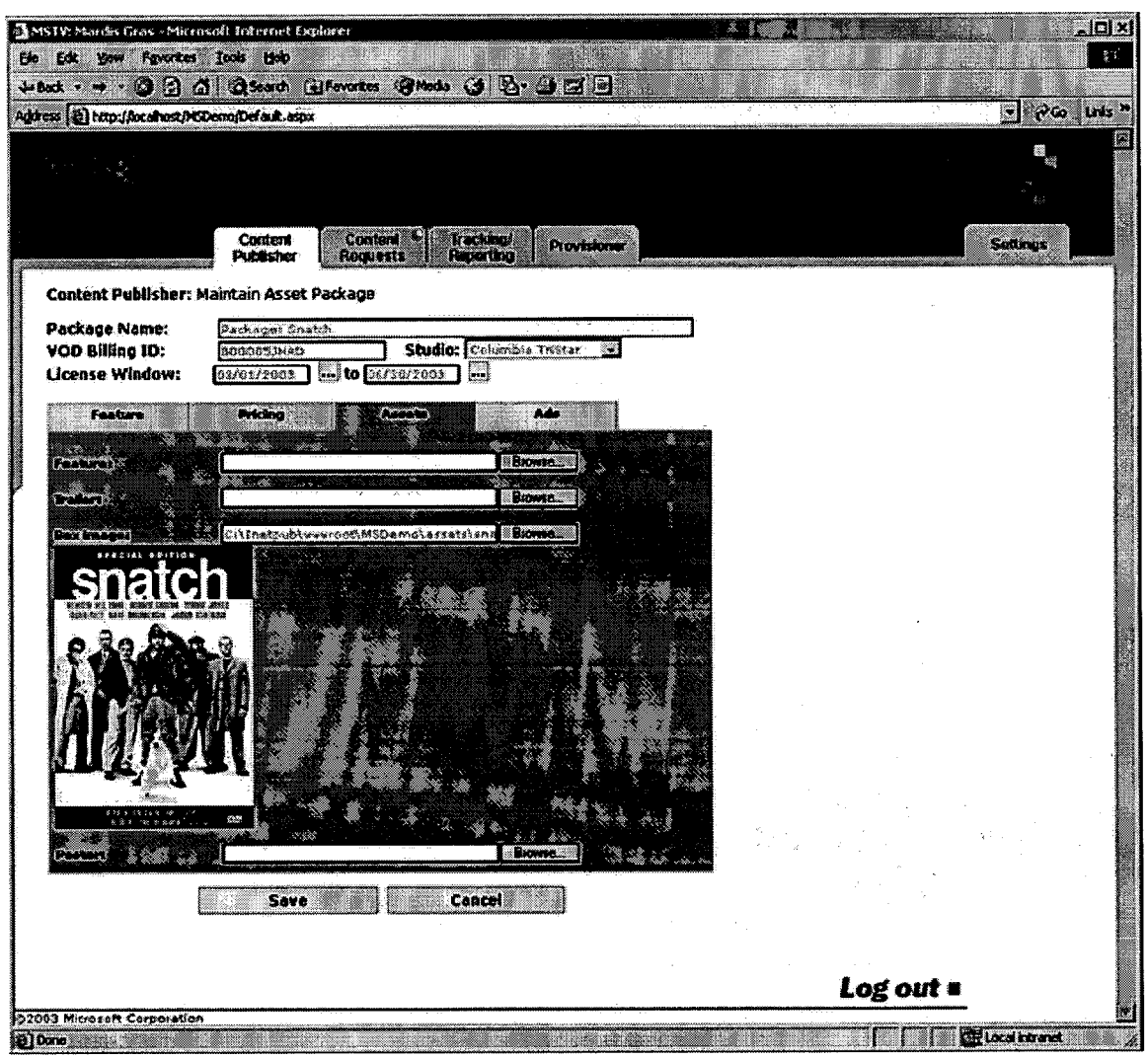
FIG. 8 is a screen shot in a browser application through which a video asset owner can input or modify information about a video asset in response to a request for same from an MSO, and where the information can be presented for review and editing via activation of various on-screen buttons.

FIG. 8 is a screen shot depicting a content publisher user interface screen for maintaining an asset package. Entry fields are shown for package name, VOD billing ID, and License Window. A feature field, a trailer field, and a box image field are also shown. An operator for a video asset owner can input or modify information about a video asset in response to a request for the video asset from an MSO. The information can be presented for review and editing via activation of various on-screen buttons that operate through a browser application.

Figure 9A:
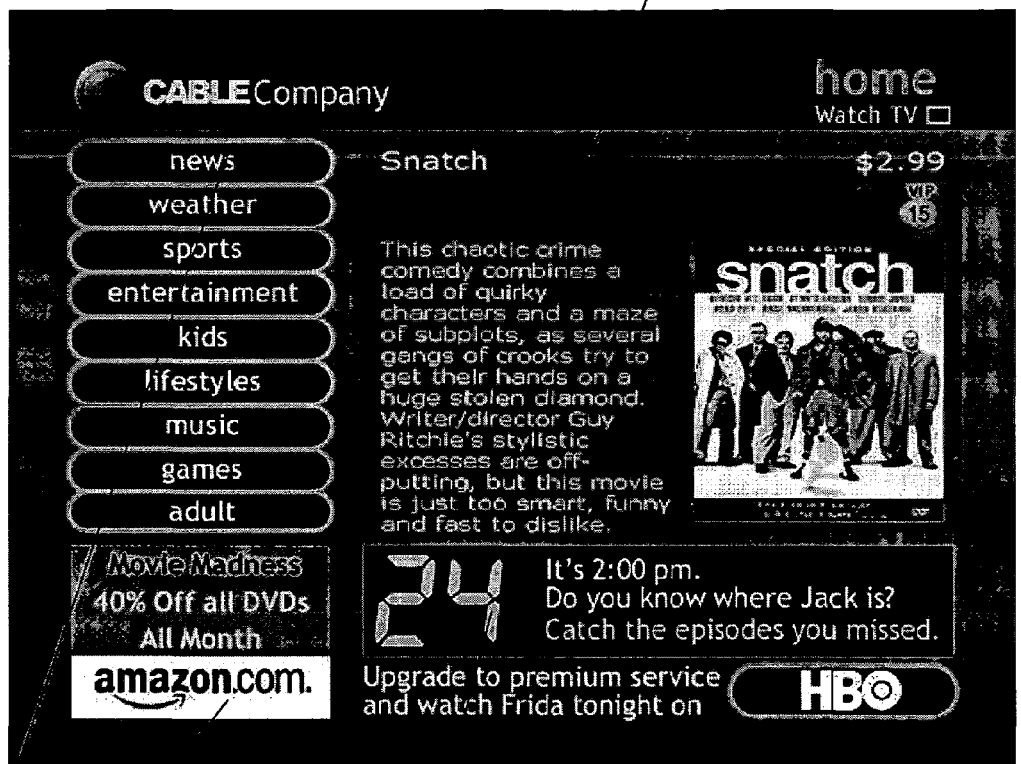
FIGS. 9*a*-9*b* are screen shots in a browser application of respective pages of a video storefront that have been designed by a video asset owner from an initial template received from an MSO, where the video asset storefront serves to place an advertisement or to advertise a video asset that is available for distribution to viewers.
Figure 9B:
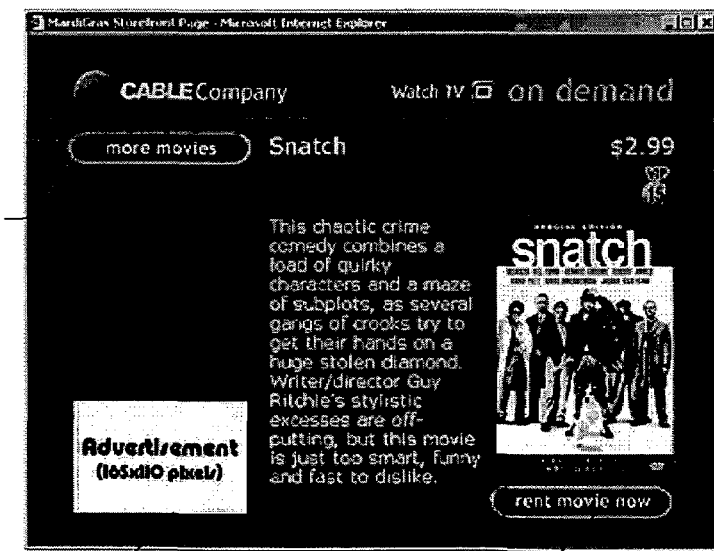

FIGS. 9a-9b are screen shots in a browser application of pages of respective storefronts that have been designed by a video asset owner. Each design was built from an initial template received from an MSO by the video asset owner, such as those seen respectively in FIGS. 6a-6b. A video asset storefront advertises a video asset to viewers who, upon payment for same, will receive delivery of the video asset for viewing. Regions 914, 916 and 918 on screen shot 900a, and region 922 on screen shot 900b, are advertisements from the video asset owners 204(n) for "amazon.com", "HBO", "the 24 TV program", and another third party such a brand ad from the MSO 202. On-screen button 912 is a highlighted "on demand" button that, when activated by a viewer, will initial a display of available video assets for a video-on-demand service. Region 920a in screen shot 900a is an advertisement for the movie "Snatch" that can be ordered as a video on demand program. Screen shot 900b in FIG. 9b shows region 920b that corresponds to region 920a in FIG. 9a. Region 920b is a storefront for the video on demand movie "Snatch". When a viewer uses an input device, such as a remote control, to activate region 920a in FIG. 9a, the workflow tool 100 will link to the page seen FIG. 9b The viewer can then decide, based upon the content and appearance of the "Snatch" storefront region 920b, whether to activate a "rent movie now" button 924 on screen shot 900b so as to pay for and begin watching the "Snatch" video asset. Thus, button 924 of screen shot 900b, when activated, initiates the 'purchase' or 'buy' of the "snatch" movie that is the featured video asset 920b by viewers as a video delivery service. Alternatively, the viewer can activate a "more movies" button 926 in FIG. 9b such that the workflow tool 100 will link to a page (not shown) that will show the viewer additional pay-per-view and/or video on demand video assets that can be ordered for the viewer's viewing.

Figure 10:
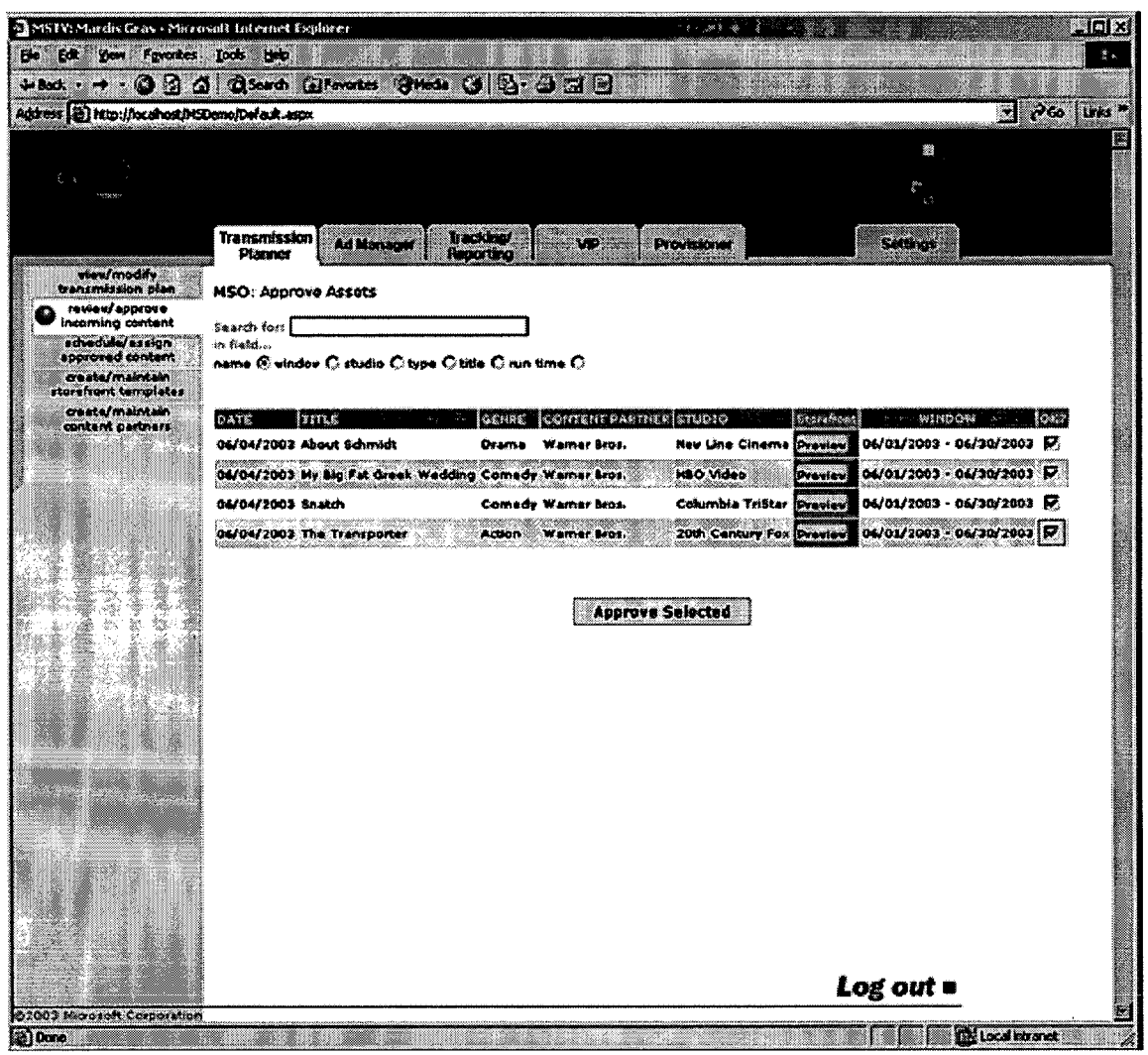
FIG. 10 is a screen shot in a browser application of a report summarizing video assets that have been requested by an MSO from various video asset owners and are available to the MSO for delivery in a video delivery service, where an operator for the MSO can approve each video asset being offered by a corresponding video asset owner, and where such approval can be generated by activating an on-screen button.

FIG. 10 is a screen shot of a report summarizing video assets that have been requested by an MSO from various video asset owners and are available to the MSO for transmission in a video delivery service. An operator for the MSO can approve each video asset being offered by a corresponding video asset owner. The approval can be generated by activating an on-screen button in a browser application.

Figure 11:
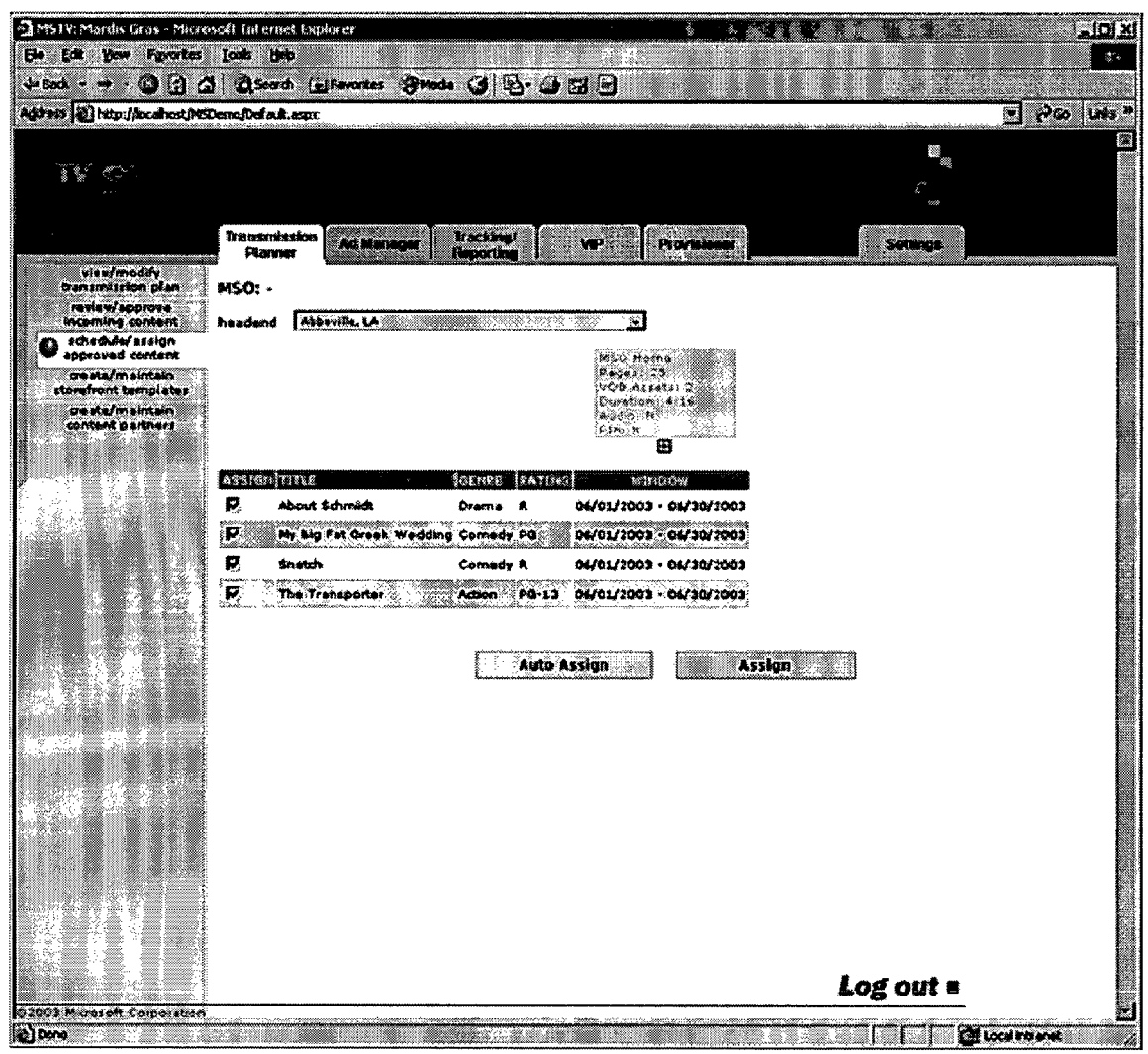
FIG. 11 is a screen shot in a browser application of a report summarizing video assets that are to be scheduled or assigned to a particular headend by an operator for an MSO, and where such assignment can be generated by activating an on-screen button.

FIG. 11 is a screen shot of a report summarizing video assets that are to be scheduled or assigned to a particular headend by an operator for an MSO. The assignment can be generated by activating an on-screen check-mark button in a browser application.

Figure 12:
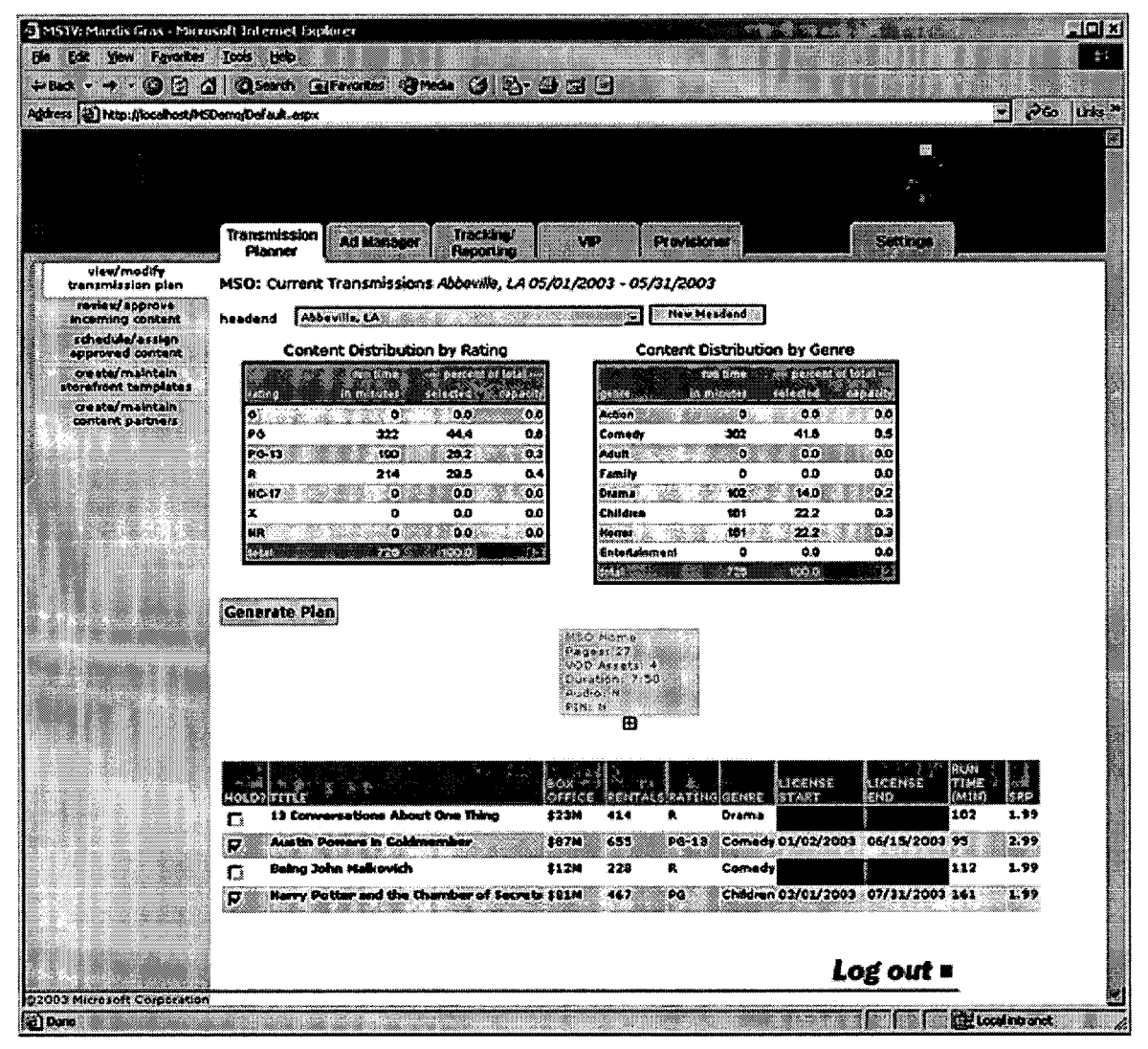

FIG. 12 is a screen shot of a report summarizing the current video assets that are available for transmission during a present time period from a particular headend. A transmission plan for the particular headend can be generated by activating an on-screen button in a browser application.

Figure 13:
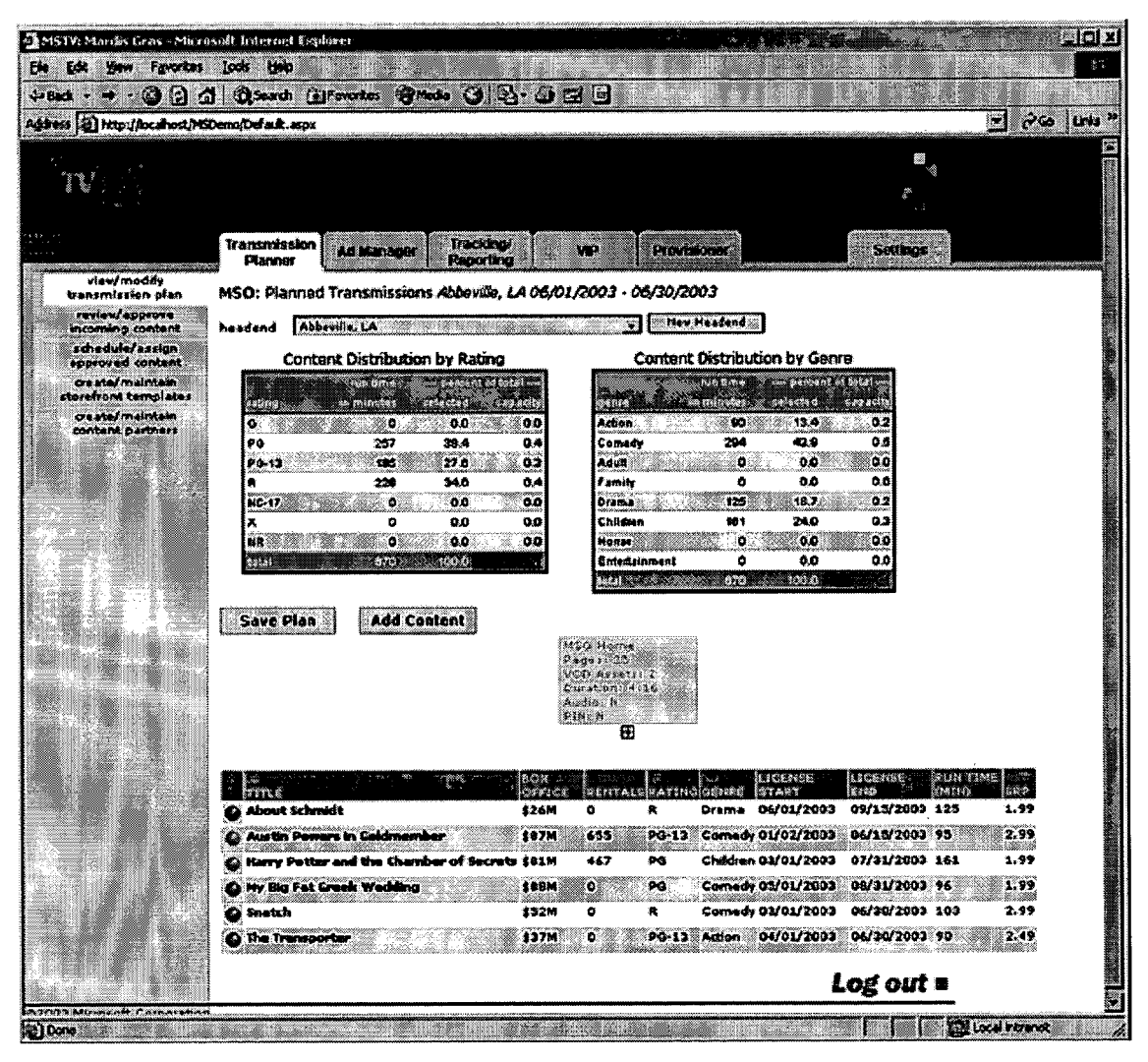

FIG. 13 is a screen shot of a planning tool useful to an operator of an MSO to assign a show plan for video assets that are to be distributed from a selected network, from regions within the network, or from headends within each region. The scheduled video asset summaries for each headend are presented, including genres and video storefront pages in each genre. The planning tool features several on-screen buttons that can be activated in a browser application.

Figure 14:
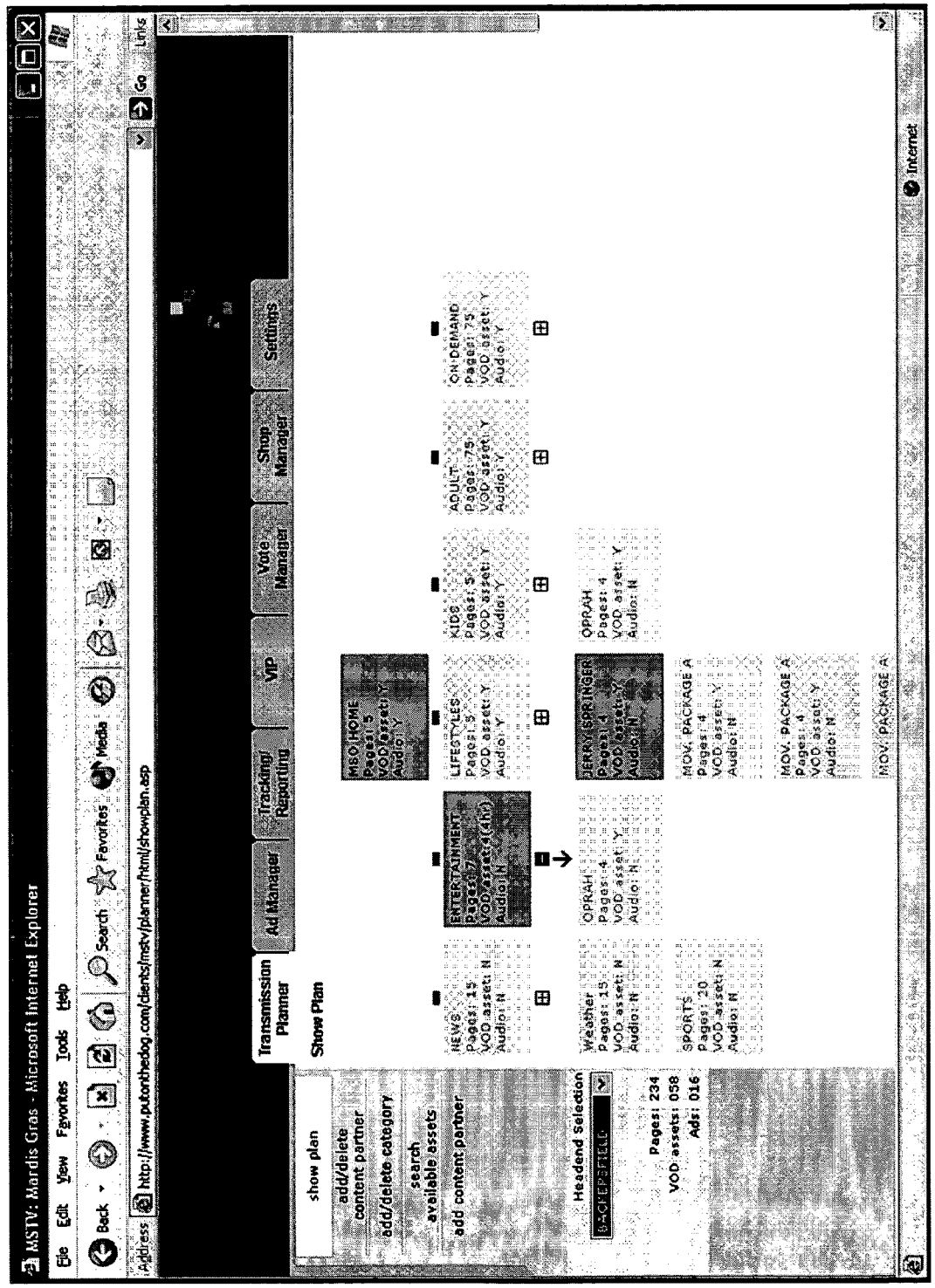
FIG. 14 is a screen shot in a browser application of a transmission plan that summarizes the planned video assets that are to be transmitted during a future time period from a particular headend.

FIG. 14 is a screen shot of a transmission planner function of workflow tool 100, where a transmission plan is shown in the screen shoot. Under the Transmission Planner tab on the screen there are, on the left hand side, several tabs "show plan", "add/delete category", "search available assets", "add content partner"—each of which represents a self explanatory plan function related to transmission planning and are basically for used by the operator for MSO 202.

Several rows and columns are seen in the screen shot of FIG. 14. The first column in the upper left side shows an entry listing "NEWS", "Pages: 15", Video asset: N", Audio: N". This entry describes a category level for news, in which there are 15 storefront pages associated with the news category, and where the entry is not for a Video asset because the news category, being contemporary and topical, is rarely a considered to be a video on demand or pay per view asset. An "Audio: Y" entry would mean that a separate audio feed is available when a viewer tunes to the storefront pages for a category. Another entry shows "Jerry Springer", "Pages: 4", "Video asset: yes", "Audio: no", which means that there are four (4) separate storefront pages, no audio feed, and one (1) or more separate video assets. Thus, the transmission planner is a way to quickly see the overall structure and contents of the carousel.

Figure 15:
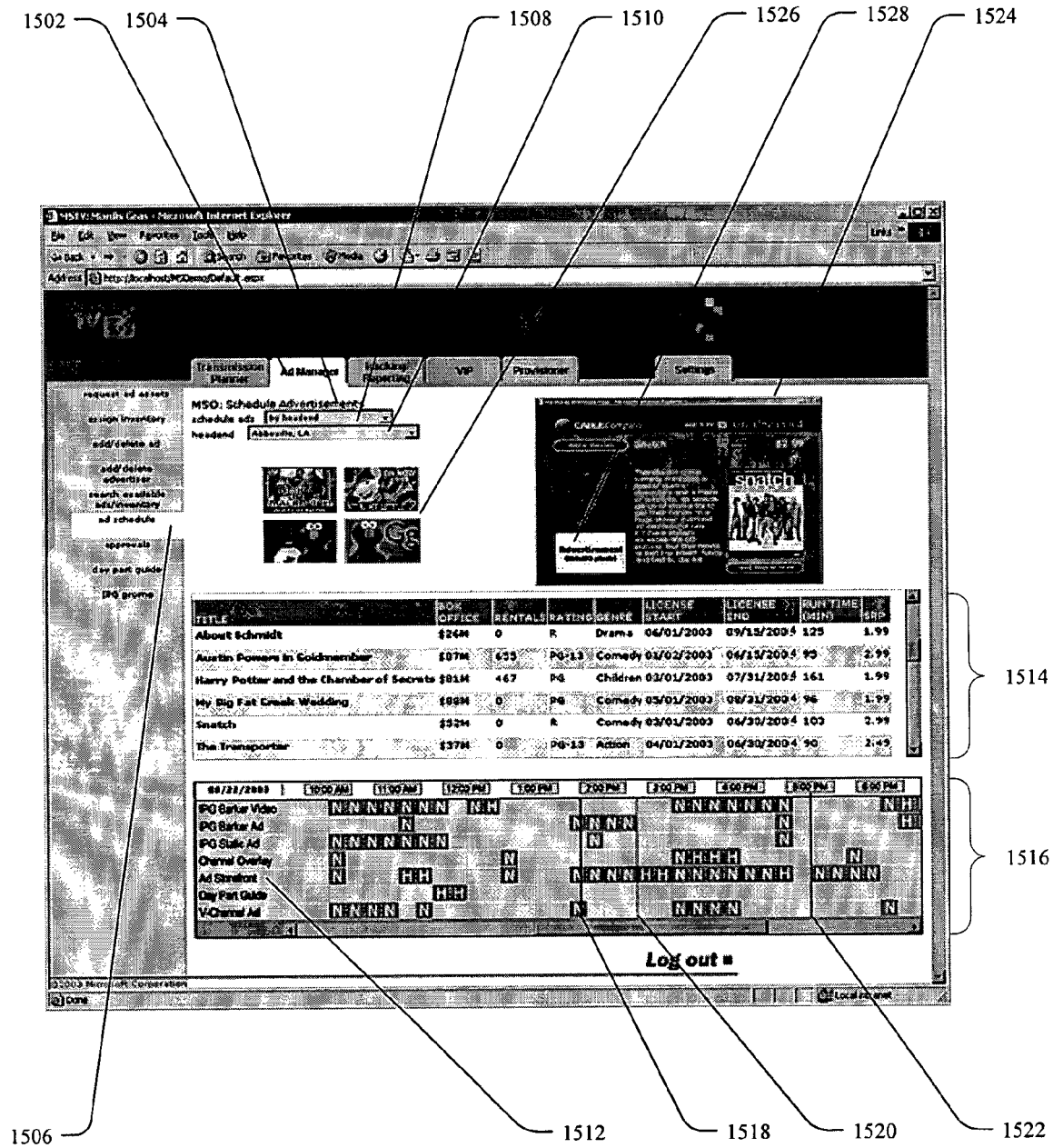
FIG. 15 is a screen shot in a browser application of an advertising management planning tool for scheduling advertisements that are to appear on video storefronts such that the advertisements are to be shown to viewers during certain hours of a day during a future time period from a particular headend.

Screen shot 1500 in FIG. 15 is shown in the same browser application as was shown for FIG. 14, where an advertising management planning tool for scheduling advertisements is indicated, respectively, at a tab 1502, a function category 1504, and a specific function 1506. An ad scheduling function 1508 allows a user to 'Schedule ads by headend' via a selection from a pull down menu. The ad scheduling function 1508 allows the user to select other choices, such as 'Schedule ads by network', 'Schedule ads by region', etc. A headend selection field 1510 is operated as a pull down menu and shows the headend 'Abbeville, LA' as being the headend that was selected by the user.

A video storefront 1524 is selected by a user from the list of storefronts seen at reference numeral 1514, where the selected video storefront 1524 has the name 'Snatch' seen in the list at reference numeral 1514. The list at reference numeral 1514 represents only those video storefronts that have corresponding video assets correctly deployed on a carousel and corresponding video on demand server for the headend 'Abbeville, LA'. Additionally, the respective licensing periods of the video assets must be valid for the day of Aug. 22, 2003, as set forth in the list at reference numeral 1514. Also, only video storefronts that have advertising space in which ads can be placed will appear in the list at reference numeral 1514. As seen in FIG. 15 at reference numeral 1528, an advertisement space having the size of 165×110 pixels is available for ad placement on the "Snatch" video storefront 1524. Also appearing on FIG. 15 are ad elements 1526 each of which has been validated for ad placement in the ad space at reference numeral 1528. The validation process for each ad element 1526 can include the requirement that each ad element have exactly the size of 165×110 pixels. For instance, each ad element 1526 may have been previously designed by the respective advertisers according to an ad element template that had been specified by a MSO to have the size of 165×110 pixels. One or more checks for compliance with business rules may also be part of the validation process for the available ad elements 1526. One such check may be mandated by the video asset owner for the video storefront 1524, for example, where the ad element can not be an ad for a video asset that is associated with a competing movie studio, or where the ad element can only be an ad for a video asset from the same movie studio. As previously discussed with respect to the regions 614, 616 and 618 of FIG. 6a, the ad elements 1526 need not be static ads but can also be moving pictures with sound. For example, the ad elements 1526 can each be a movie trailer for a video asset, or can be a video advertisement of a product or service that is being offered for sale.

The user can schedule when an ad element will appear on the video storefront 1524. To schedule an ad element on the video storefront 1524 for viewing by viewers, the user clicks on a name of the video storefront in the list at reference numeral 1514. When the user clicks on the name, the video storefront appears on screen shot 1500, such as is seen at reference numeral 1524. After clicking on the name of the video storefront in list 1514, the user then selects one of the ad elements 1526 by clicking on the user's selection. The user then drags the selected ad element 1526 to an available time slot in an Ad Storefront Row 1512 in a timeline schedule 1516. For example, the timeline schedule 1516 shows in the Ad Storefront Row 1512 that advertisements have already been scheduled to appear with the "Snatch" video storefront 1524 for Aug. 22, 2003. As such, the selected ad element 1526 can be scheduled to appear at ad space 1528 on video storefront 1524 for all but the time slots that have already been scheduled as shown in screen shot 1500.

The ad scheduling aspect of the ad management application may be configured to such that a user can schedule an ad to appear on a video storefront by using only the Ad Storefront Row 1512 in timeline schedule 1516, and no other of the rows in timeline schedule 1516. Other rows in timeline schedule 1516, not relevant to the present discussion, represent other visual content that can be displayed to a viewer under various conditions of interaction with the viewer. In timeline schedule 1516, an icon "H" indicates individual headend scheduling and an "N" icon indicates network-wide scheduling.

The timeline schedule 1516 is shown in screen shot 1500 as being divided by markers 1518, 1520, and 1522. The ad scheduling aspect of the ad management application may be configured to set these markers on the timeline schedule 1516. For instance, a marker of one color and weight could be automatically set at a time that separates the different specific time of day, such as at a division between the afternoon and the evening, as is shown at 5:00 PM. The application can also be configured to set a marker at the current time of day. Alternatively, the user may be enabled to set other markers at their time of their own discretion.

Exemplary Environment

Figure 16:
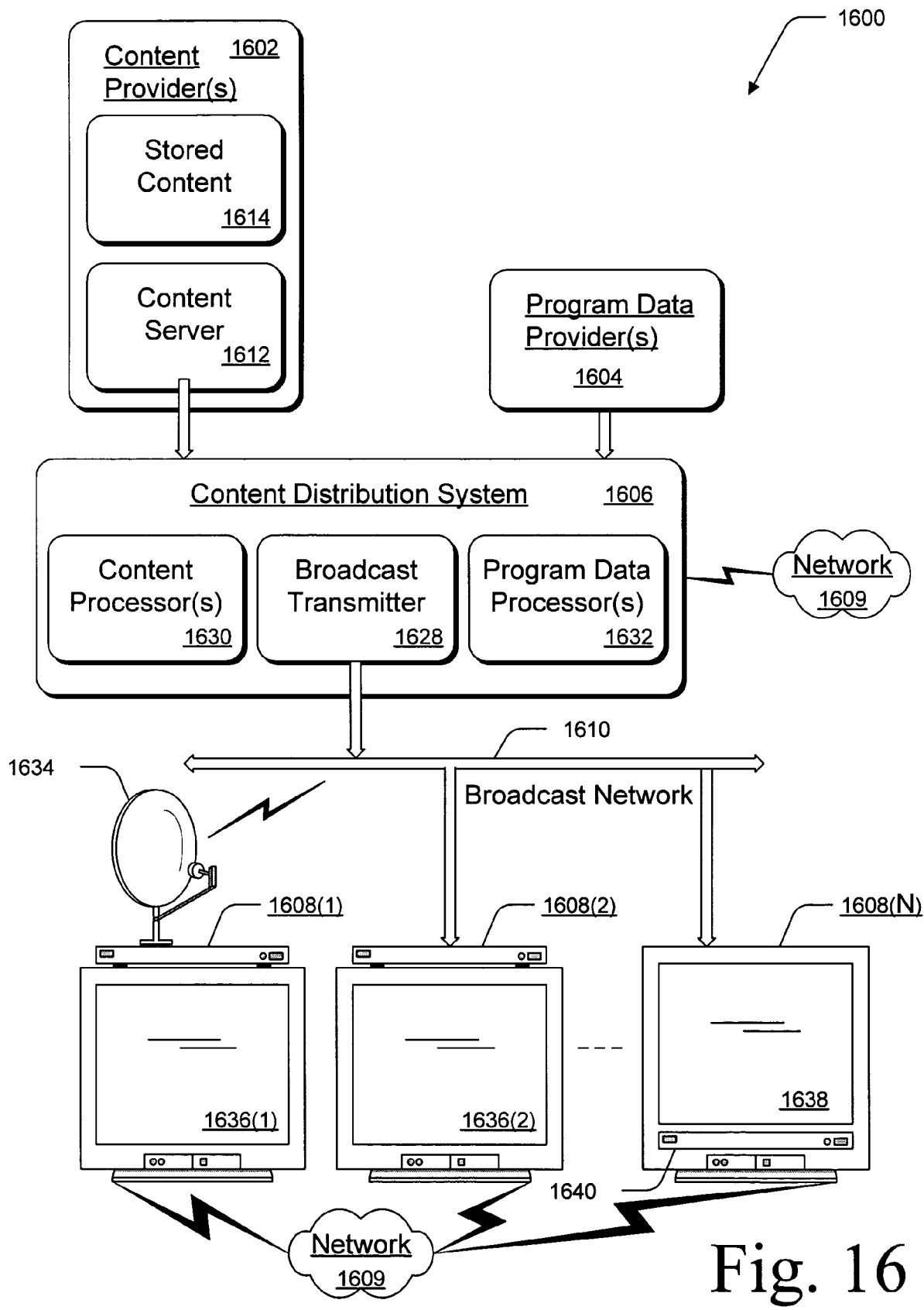
FIG. 16 illustrates an exemplary environment in which a viewer can receive multimedia content via a client device as may be implemented by the systems, apparatus, methods, and computer readable medium described herein.

FIG. 16 illustrates an exemplary environment in which a viewer can receive multimedia content via a client device as may be implemented by the systems, apparatus, methods, and computer readable medium described herein. Exemplary environment 1600 is a television entertainment system that facilitates distribution of content and program data to multiple viewers. The environment 1600 includes one or more content providers 1602, one or more program data providers 1604, a content distribution system 1606, and multiple client devices 1608(1), 1608(2), . . . , 1608(N) coupled to the content distribution system 1606 via a broadcast network 1610. By way of analogy, environment 1600 corresponds to environment 200, where content providers 1602 correspond to content owners 204, and where content distribution system 1606 corresponds to MOS 202.

Content provider 1602 includes a content server 1612 and stored content 1614, such as movies, television programs, commercials, music, and similar audio and/or video content. Content server 1612 controls distribution of the stored content 1614 from content provider 1602 to the content distribution system 1606. Additionally, content server 1612 controls distribution of live content (e.g., content that was not previously stored, such as live feeds) and/or content stored at other locations to the content distribution system 1606.

Program data provider 1604 stores and provides an electronic program guide (EPG) database as well as storefronts. Program data in the EPG includes program titles, ratings, characters, descriptions, actor names, station identifiers, channel identifiers, schedule information, and so on. The terms "program data" and "EPG data" are used interchangeably throughout this discussion. For discussion purposes, an electronic file maintains the program data that may include a program title, a program day or days to identify which days of the week the program will be shown, and a start time or times to identify the time that the program will be shown on the particular day or days of the week.

The program data provider 1604 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The program data provider 1604 controls distribution of the published version of the program data to the content distribution system 1606 using, for example, a file transfer protocol (FTP) over a TCP/IP network (e.g., Internet, UNIX, etc.). Further, the published version of the program data can be transmitted from program data provider 1604 via a satellite 1634 directly to a client device 1608 by use of a satellite dish 1634.

Content distribution system 1606 includes a broadcast transmitter 1628, one or more content processors 1630, and one or more program data processors 1632. Broadcast transmitter 1628 broadcasts signals, such as cable television signals, across broadcast network 1610. Broadcast network 1610 can include a cable television network, RF, microwave, satellite, and/or data network, such as the Internet, and may also include wired or wireless media using any broadcast format or broadcast protocol. Additionally, broadcast network 1610 can be any type of network, using any type of network topology and any network communication protocol, and can be represented or otherwise implemented as a combination of two or more networks.

Content processor 1630 processes the content received from content provider 1602 prior to transmitting the content across broadcast network 1608. Similarly, program data processor 1632 processes the program data received from program data provider 1604 prior to transmitting the program data across broadcast network 1610. A particular content processor 1630 may encode, or otherwise process, the received content into a format that is understood by the multiple client devices 1608(1), 1608(2), . . . , 1608(N) coupled to broadcast network 1610. Although FIG. 16 shows a single content provider 1602, a single program data provider 1604, and a single content distribution system 1606, exemplary environment 1600 can include any number of content providers and/or program data providers coupled to any number of content distribution systems.

Content distribution system 1606 is representative of a headend service with one or more carousels that provides storefronts and EPG data, as well as content, to multiple subscribers. Each content distribution system 1604 may receive a slightly different version of the program data that takes into account different programming preferences and lineups. The program data provider 1604 creates different versions of EPG data (e.g., different versions of a program guide) that include those channels of relevance to respective headend services, and the content distribution system 1606 transmits the EPG data to the multiple client devices 1608(1), 1608(2), . . . , 1608(N). In one implementation, for example, content distribution system 1606 utilizes a carousel file system to repeatedly broadcast the EPG data and storefronts over an out-of-band (OOB) channel to the client devices 1608.

Client devices 1608 can be implemented in a number of ways. For example, a client device 1608(1) receives broadcast content from a satellite-based transmitter via satellite dish 1634. Client device 1608(1) is also referred to as a set-top box or a satellite receiving device. Client device 1608(1) is coupled to a television 1636(1) for presenting the content received by the client device (e.g., audio data and video data), as well as a graphical user interface. A particular client device 1608 can be coupled to any number of televisions 1636 and/or similar devices that can be implemented to display or otherwise render content. Similarly, any number of client devices 1608 can be coupled to a single television 1636.

Client device 1608(2) is also coupled to receive broadcast content from broadcast network 1610 and provide the received content to associated television 1636(2). Client device 1608(N) is an example of a combination television 1638 and integrated set-top box 1640. In this example, the various components and functionality of the set-top box are incorporated into the television, rather than using two separate devices. The set-top box incorporated into the television may receive broadcast signals via a satellite dish (similar to satellite dish 1634) and/or via broadcast network 1610. In alternate implementations, client devices 1608 may receive broadcast signals via network 1609, such as the Internet, or any other broadcast medium.

Each client device 1608 runs an electronic program guide (EPG) application that utilizes the program data. An EPG application enables a television viewer to navigate through an onscreen program guide and locate television shows of interest to the viewer. With an EPG application, the television viewer can look at schedules of current and future programming, set reminders for upcoming programs, and/or enter instructions to record one or more television shows.

The EPG application enables the television viewer to look at EPG and storefronts for the purpose of ordering and viewing linear programming as well as pay per view and/or video on demand programming. As such, one or more of the program data providers 1604 can include stored on-demand content, such as Video On-Demand (VOD) movie content, and near VOD such as pay per view movie content. The stored on-demand and near on-demand content can be viewed with a client device 1608 through an onscreen movie guide, for example, and a viewer can enter instructions to stream a particular movie, or other stored content, down to a corresponding client device 1608.

Each client device 1608 (1 through N) and the content distribution system 1606 are in communication with a network 1609 that provides two-way communications there between. The content distribution system 1606 servers EPG data and storefronts to any requesting client device 1608 (1 through N). To request EPG data and storefronts on the two-way network 1609, each client device 1608 transmits a request to the content distribution system 1606.

Exemplary Client Device

Figure 17:
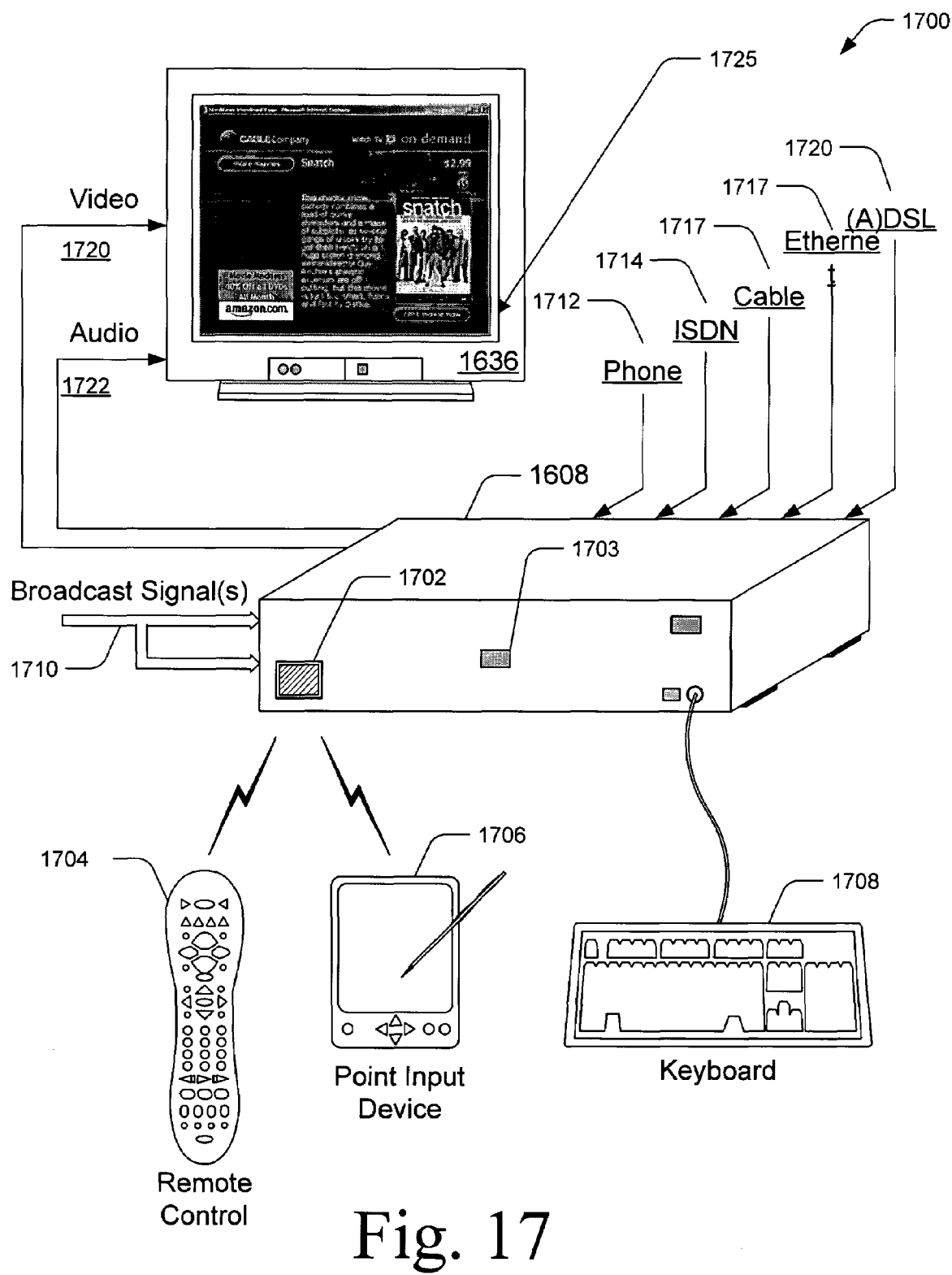
FIG. 17 illustrates of an example client device, a television, and various input devices that interact with the client device.

FIG. 17 illustrates an exemplary implementation 1700 of a client device 1608 shown as a standalone unit that connects to a television 1736. Client device 1608 can be implemented in any number of embodiments, including as a set-top box, a satellite receiver, a TV recorder with a hard disk, a game console, an information appliance, and so forth. Client device 1608 includes a wireless receiving port 1702, such as an infrared (IR) or Bluetooth wireless port, for receiving wireless communications from a remote control device 1704, a handheld input device 1706, or any other wireless device, such as a wireless keyboard. Handheld input device 1706 can be a personal digital assistant (PDA), handheld computer, wireless phone, or the like. Additionally, a wired keyboard 1708 is coupled to communicate with the client device 1608. In alternate embodiments, remote control device 1704, handheld device 1706, and/or keyboard 1708 may use an RF communication link or other mode of transmission to communicate with client device 1608.

Client device 1608 receives one or more broadcast signals 1710 from one or more broadcast sources, such as from a satellite or from a broadcast network. Client device 1608 includes hardware and/or software for receiving and decoding broadcast signal 1710, such as an NTSC, PAL, SECAM or other TV system video signal. Client device 1608 also includes hardware and/or software for providing the viewer with a graphical user interface by which the viewer can, for example, access various network services, configure the client device 1608, and perform other functions.

Client device 1608 is capable of communicating with other devices via one or more connections including a conventional telephone link 1712, an ISDN link 1714, a cable link 1716, an Ethernet link 1718, an ADSL and/or DSL link 1720, and the like. Client device 1608 may use any one or more of the various communication links 1712-1720 at a particular instant to communicate with any number of other devices and/or to establish a two-way communication with the content distribution system 1606 seen in FIG. 16.

Client device 1608 generates video signal(s) 1720 and audio signal(s) 1722, both of which are communicated to television 1636. The video signals and audio signals can be communicated from client device 1608 to television 1636 via an RF (radio frequency) link, S-video link, composite video link, component video link, or other communication link. At reference numeral 1703 in FIG. 17, client device 1608 includes one or more lights or other indicators identifying the current status of the device or for diagnostic reports to a viewer. Additionally, the client device may include one or more control buttons, switches, or other selectable controls for controlling operation of the device.

Figure 18:
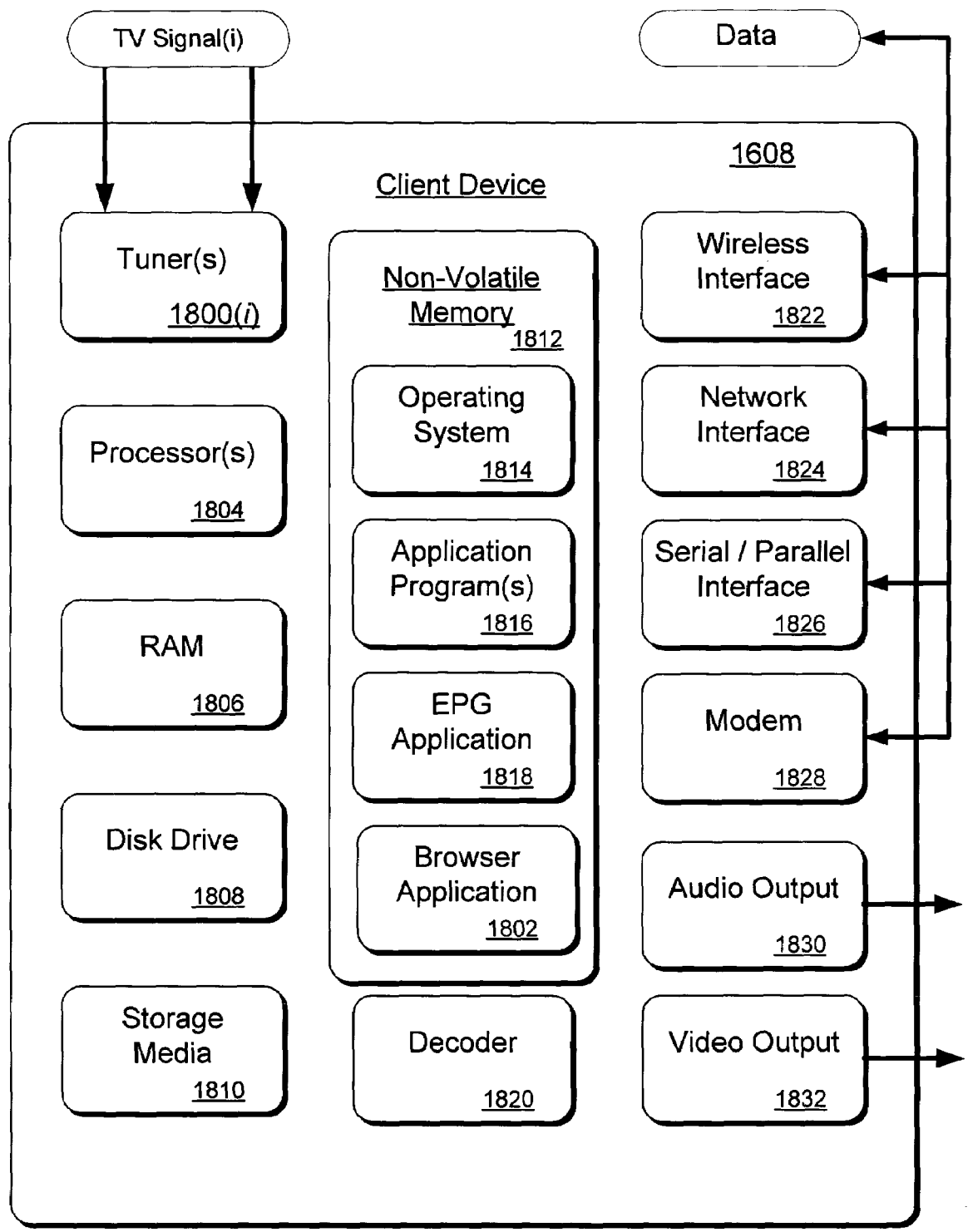
FIG. 18 is a block diagram that illustrates components of the example client device(s) shown in FIGS. 16, and 17.

FIG. 18 illustrates selected components of client device(s) 1608 shown in FIGS. 16 and 17. Client device 1608 includes one or more tuners 1800($i$). Tuners 1800($i$) are representative of one or more in-band tuners that tune to various frequencies or channels to receive television signals, as well as an out-of-band tuner that tunes to the broadcast channel over which the EPG data, including storefronts, is broadcast to client device 1608.

Client device 1608 also includes one or more processors 1804 and one or more memory components. Examples of possible memory components include a random access memory (RAM) 1806, a disk drive 1808, a mass storage component 1810, and a non-volatile memory 1812 (e.g., ROM, Flash, EPROM, EEPROM, etc.). Alternative implementations of client device 1608 can include a range of processing and memory capabilities, and may include more or fewer types of memory components than those illustrated in FIG. 18. For example, full-resource clients can be implemented with substantial memory and processing resources, including a disk drive 1808 to store content for replay by the viewer. Low-resource clients, however, may have limited processing and memory capabilities, such as a limited amount of RAM 1806, no disk drive 1808, and limited processing capabilities. Nevertheless it is intended that client device 1608 include a capability for video recording, either locally or remotely from client device 1608.

Processor(s) 1804 process various instructions to control the operation of client device 1608 and to communicate with other electronic and computing devices. The memory components (e.g., RAM 1806, disk drive 1808, storage media 1810, and non-volatile memory 1812) store various information and/or data such as content, EPG data, storefronts, configuration information for client device 1608, and/or graphical user interface information.

An operating system 1814 and one or more application programs 1816 may be stored in non-volatile memory 1812 and executed on processor 1804 to provide a runtime environment. A runtime environment facilitates extensibility of client device 1608 by allowing various interfaces to be defined that, in turn, allow application programs 1816 to interact with client device 1608. In the illustrated example, an EPG application 1818 is stored in memory 1812 to operate on the EPG data and generate a program guide. The application programs 1816 and the EPG application 1818, when executed, perform the video storefront functions as disclosed herein, which execution may be implemented at client device 1608. The application programs 1816 can also include an email program to facilitate electronic mail, and so on.

FIG. 18 shows non-volatile memory 1812 having a browser application 1802 which, when executed by processor(s) 1804, browses the Web. Browser application 1802 can be used to initiate a request to display a storefront and also initiates a demand for the viewing of a pay per view and/or video on demand program from content distribution system 1606 seen in FIG. 16 via a two-way network. The request and demand are executed by one or more processors 1804 of browser application 1802 so as to retrieve the storefront and programming which can be then be stored in any location within any memory device of client device 1608, such as in non-volatile memory 1812, RAM 1806, disk drive 1808, and/or storage media 1810. The communication on the two-way network to the content distribution system 1606 is made using network interface 1824, wireless interface 1822, serial/parallel interface 1826, modem 1828, or other well known communication hardware/software algorithms and protocol for computing devices. By way of example, such communication can be architected similar to that seen in FIG. 16 via two-way network 1609. Although not shown, client device 1608 may also include other types of data communication interfaces to communicate with other devices. Modem 1828 facilitates client device 1608 communications with other electronic and computing devices via a conventional telephone line. Components seen at reference numerals 1816 and 1822-1828 facilitate applications where client device 1608 has Internet access or communicates data on a two-way network.

Client device 1608 also includes an audio output 1830 and a video output 1832 that provide signals to a television or other device that processes and/or presents or otherwise renders the audio and video data. Although shown separately, some of the components of client device 1608 may be implemented in an application specific integrated circuit (ASIC). Additionally, a system bus (not shown) typically connects the various components within client device 1608. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is been made herein to one or more client devices, such as client device 1608. As used herein, "client device" means any electronic device having data communications, data storage capabilities, and/or functions to process signals, such as broadcast signals, received from any of a number of different sources.

Implementations extend to methods, client devices, digital video recorders, computer programs, and systems for recording programming content by requesting and receiving real time data. The implementations may comprise a special purpose or general purpose computer including various computer hardware as discussed by way of example in greater detail above.

Implementations also include computer-readable storage media for carrying or having computer-executable instructions or data structures stored thereon. Such computer-readable storage media can be any available media which can be accessed by a general purpose or special purpose computer. One example of a special purpose computer is a set top box. By way of example, and not limitation, such computer-readable storage media can comprise RAM, ROM, EEPROM, CD-ROM, DVR-R or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection to a computer, the computer properly views the connection as a computer-readable storage medium. Thus, any such a connection is properly termed a computer-readable storage medium. Combinations of storage and transferring of the above should also be included within the scope of computer-readable storage media. Computer-executable instructions comprise, for example, instructions and data which cause a general purpose computer, special purpose computer, or special purpose processing device to perform a certain function or group of functions.

The Figures and the foregoing discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multiprocessor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, from one or more content providers, one or more Internet transmissions each comprising information regarding a multimedia content program available for real time distribution during a future time period to third parties, wherein the one or more Internet transmissions are received by a computer having a memory and a processor, and wherein the future time period corresponds to a license period established by the one or more content providers;
receiving input selecting at least one said multimedia content program;
transmitting to a computer operated by one or more of the content providers by way of an Internet protocol:
a request for the selected at least one said multimedia content program; and
one or more initial Web-based templates which require the one or more of the content providers to return a video storefront that is compatible with a carousel which will be used for delivering the selected at least one said multimedia content program to the third parties, wherein each Web-based template is a storefront Web page, and wherein each initial Web-based template comprises at least one advertising space;
entering or selecting required metadata for each one or more initial Web-based templates;
querying whether required metadata have been included in each of the one or more initial Web-based templates, wherein the querying comprises querying whether at least one advertisement has been selected for each advertising space and querying whether each advertisement for each time slot for each of the one or more initial Web-based templates has been designated as either headend scheduled or network-wide scheduled;
preventing transmission of each of the one or more initial Web-based templates when all required metadata has not been entered or selected for a corresponding initial Web-based template;
receiving from the computer operated by the one or more content providers by way of an Internet protocol, in one or more transmissions, one or more final Web-based templates each conforming to a corresponding said initial Web-based template and comprising information descriptive of the selected at least one said multimedia content program;
issuing a query to determine if a video asset intrinsic matches a corresponding multimedia content program thereby ensuring that the overall end to end system of supplying a requested multimedia content program is likely to function as represented to an end viewer; and
transmitting each said final Web-based template to a predetermined network resource at a predetermined time corresponding to the time period of availability, and transmitting to a carousel at a headend a multimedia content program corresponding to each said final Web-based template for real time distribution to third parties during the future time period, wherein each final Web-based template is a storefront Web page.

2. A method as described in claim 1, further comprising:
receiving a request from one said third party for a real time distribution of one said multimedia content program;
initiating the real time distribution of the one said multimedia content program to said third party from the corresponding said network resource; and
prepopulating one or more required metadata in initial Web-based templates before transmitting the initial Web-based templates to one or more of the content providers by way of an Internet protocol, wherein the one or more required metadata are previously stored in a multimedia content metadata database.

3. A method as described in claim 1, wherein each said multimedia content program is either a pay per view or a video on demand, and wherein the method further comprises providing an element within each initial Web-based template through which a content provider reduces a number of required metadata needed to be entered prior to entering or selecting required metadata for each one or more initial Web-based templates.

4. A method as described in claim 1, wherein the information regarding the multimedia content program is selected from the group consisting of:
a title of the multimedia content program;
the future time period;
a genre;
the name of the content provider;
a studio corresponding to the multimedia content program;
a preview of a storefront corresponding to the multimedia content program;
the run time for the multimedia content program;
the type of the multimedia content program;
a value for the box office revenue generated by the multimedia content program during its theatrical release;
a rating value; and
a combination of the foregoing.

5. A method as described in claim 1, wherein each said multimedia content program comprises:
a preview of a multimedia presentation; and
the multimedia presentation.

6. A method as described in claim 1, wherein each said final template comprises a title, a textual description, and an image associated with the multimedia content program corresponding thereto, and wherein the method further comprises:
polling one or more catalogs of video delivery servers to determine whether a video asset is available for distribution, the polling being performed after transmitting each final Web-based template; and
scheduling a video asset for deployment to a carousel at a headend.

7. A method as described in claim 1, wherein each said final template comprises one or more markup language pages.

8. A method as described in claim 1, wherein the transmitting each said final Web-based template to the predetermined network resource further comprises an interactive scheduling routine for the predetermined network resource that corresponds to the time period of availability of the multimedia content program, wherein each advertising space is of a predetermined size.

9. A method as described in claim 1, wherein the predetermined network resource is selected from the group consisting of: a carousel, a headend, a plurality of headends, a server, a production server, a staging and preview server, and a combination of the foregoing.

10. A method as described in claim 1, wherein each said third party is selected from the group consisting of:
a client device;

a set top box for receiving a communication service; and
a personal computer.

11. A computer readable storage medium comprising instructions that, when executed by a computer, perform the method of claim 1.

12. A method comprising:

sending, to a computer of a network operator, one or more Internet transmissions each comprising information regarding a multimedia content program available for real time distribution during a future time period to third parties, wherein the future time period corresponds to a license period established by the one or more content providers;

in response to the sending, receiving from the network operator by way of an Internet protocol:
　a request for one or more said multimedia content programs; and
　one or more initial Web-based templates which require including a video storefront that is compatible with a carousel which will be used by the network operator for delivering the one or more said multimedia content programs to the third parties, wherein each Web-based template is a storefront Web page, and
wherein each initial Web-based template comprises at least one advertising space;

associating information descriptive of one said requested multimedia content program with one said initial Web-based template to form a final Web-based template for each said requested multimedia content program;

querying whether required metadata have been included in each of the one or more initial Web-based templates, wherein the querying comprises querying whether at least one advertisement has been selected for each advertising space and querying whether each advertisement for each time slot for each of the one or more initial Web-based templates has been designated as either headend scheduled or network-wide scheduled;

preventing transmission of each of the one or more initial Web-based templates when all required metadata has not been entered or selected for a corresponding initial Web-based template;

issuing a query to determine if a video asset intrinsic matches of each final Web-based template matches a corresponding multimedia content program thereby ensuring that the overall end to end system of supplying a requested multimedia content program is likely to function as represented to an end viewer; and transmitting, to the network operator, each said final Web-based template, and transmitting to a carousel at a headend a multimedia content program corresponding to each said final Web-based template for real time distribution by the network operator during the future time period to third parties, wherein each final Web-based template is a storefront Web page.

13. The method as described in claim 12, wherein the sending, the receiving, the associating, and the transmitting are performed by interactive operation of an Internet browser application, and wherein the method further comprises pre-populating one or more required metadata in the initial Web-based templates before receiving from the network operator by way of an Internet protocol the initial Web-based templates, wherein the one or more required metadata are previously stored in a multimedia content metadata database.

14. A method as described in claim 12, wherein each said multimedia content program is a video on demand, and wherein the method further comprises providing an element within each initial Web-based template through which a content provider reduces a number of required metadata needed to be entered prior to entering or selecting required metadata for each one or more initial Web-based templates.

15. A method as described in claim 12, wherein the information regarding the multimedia content program is selected from the group consisting of:
　a title of the multimedia content program;
　the future time period;
　a genre;
　the name of the content provider;
　a studio corresponding to the multimedia content program;
　a preview availability for the multimedia content program;
　the run time for the multimedia content program;
　the type of the multimedia content program;
　a value for the box office revenue generated by the multimedia content program during its theatrical release;
　a rating value; and
　a combination of the foregoing.

16. A method as described in claim 12, wherein each said final Web-based template comprises one or more markup language pages, and wherein the method further comprises:
　polling one or more catalogs of video delivery servers to determine whether a video asset is available for distribution, the polling being performed after transmitting each final Web-based template; and
　scheduling a video asset for deployment to a carousel at a headend.

17. A method as described in claim 12, wherein the information descriptive of one said requested multimedia content program that is associated with one said initial Web-based template to form the final Web-based template comprises a title, a textual description, and an image associated with the multimedia content program corresponding to the final Web-based template.

18. A method as described in claim 12, wherein each said third party is selected from the group consisting of: a client device, a set top box for receiving a communication service and a personal computer; and
　wherein each initial Web-based template comprises at least one advertising space where each advertising space is of a predetermined size, and wherein querying whether required metadata have been included in each of the one or more initial Web-based templates additionally comprises querying whether at least one advertisement has been selected for each advertising space.

19. A computer readable storage medium comprising instructions that, when executed by a computer, perform the method of claim 12.

* * * * *